(12) United States Patent
Otaka

(10) Patent No.: US 11,184,571 B2
(45) Date of Patent: Nov. 23, 2021

(54) SOLID-STATE IMAGING DEVICE HAVING A LOWER POWER CONSUMPTION COMPARATOR

(71) Applicant: BRILLNICS SINGAPORE PTE. LTD., Singapore (SG)

(72) Inventor: Toshinori Otaka, Tokyo (JP)

(73) Assignee: BRILLNICS SINGAPORE PTE. LTD., Singapore (SG)

( * ) Notice: Subject to any disclaimer, the term of this patent is extended or adjusted under 35 U.S.C. 154(b) by 22 days.

(21) Appl. No.: 16/738,853

(22) Filed: Jan. 9, 2020

(65) Prior Publication Data

US 2020/0228740 A1 Jul. 16, 2020

(30) Foreign Application Priority Data

Jan. 11, 2019 (JP) .............................. JP2019-003154

(51) Int. Cl.
*H04N 5/378* (2011.01)
*H04N 5/355* (2011.01)
(Continued)

(52) U.S. Cl.
CPC ............. *H04N 5/378* (2013.01); *H04N 5/355* (2013.01); *H04N 5/363* (2013.01); *H04N 5/37455* (2013.01)

(58) Field of Classification Search
CPC ........ H04N 5/378; H04N 5/355; H04N 5/363; H04N 5/37455
See application file for complete search history.

(56) References Cited

U.S. PATENT DOCUMENTS 7,164,114 B2 1/2007 Lai et al.
2005/0195304 A1 9/2005 Nitta et al.
(Continued)

FOREIGN PATENT DOCUMENTS

EP 3282688 A1 2/2018
JP 2005-278135 A 10/2005
(Continued)

OTHER PUBLICATIONS

European Patent Office, Extended European Search Report issued in EP Patent Application No. 20151171.4, dated Apr. 8, 2020, pp. 1-6.

*Primary Examiner* — Nicholas G Giles
(74) *Attorney, Agent, or Firm* — Pillsbury Winthrop Shaw Pittman LLP

(57) ABSTRACT

Provided are a solid-state imaging device, a method for driving the same and an electronic apparatus where a comparator in an AD converter in a digital pixel is characterized by low power consumption and low peak current and that are capable of operating at low voltage and achieving high linearity across the entire input range. A comparator is constituted by two stages of preamplifiers with a clamp diode and two serial current-controlling inverters, and every branch is current-controlled. The two stages of the preamplifiers and the following two consecutive inverters are all current-controlled such that low power consumption and low peak current are realized. A trade-off can be made between the noise and the comparator speed by controlling the bandwidth of the comparator using the bias current. This is beneficial to more than one comparator operation mode.

20 Claims, 25 Drawing Sheets

(51) Int. Cl.
*H04N 5/363* (2011.01)
*H04N 5/3745* (2011.01)

(56) References Cited

U.S. PATENT DOCUMENTS

| | | |
|---|---|---|
| 2007/0008206 A1* | 1/2007 | Tooyama ............... H04N 5/378 |
| | | 341/155 |
| 2008/0094271 A1 | 4/2008 | Tooyama et al. |
| 2010/0181464 A1 | 7/2010 | Veeder |
| 2017/0237928 A1* | 8/2017 | Kusano .................. H03M 1/56 |
| | | 348/294 |
| 2017/0272678 A1* | 9/2017 | Sakakibara .......... H03K 5/2481 |
| 2019/0335127 A1* | 10/2019 | Kawasaki .......... H04N 5/37455 |

FOREIGN PATENT DOCUMENTS

| | | |
|---|---|---|
| JP | 2005-295346 A | 10/2005 |
| WO | 2018/021055 A1 | 2/2018 |

* cited by examiner

Read out timing example

SOLID-STATE IMAGING DEVICE HAVING A LOWER POWER CONSUMPTION COMPARATOR

CROSS-REFERENCE TO RELATED APPLICATIONS

This application is based on and claims the benefit of priority from Japanese Patent Application Serial No. 2019-003154 (filed on Jan. 11, 2019), the contents of which are hereby incorporated by reference in their entirety.

TECHNICAL FIELD

The present invention relates to a solid-state imaging device, a method for driving a solid-state imaging device, and an electronic apparatus.

BACKGROUND

Solid-state imaging devices (image sensors) including photoelectric conversion elements for detecting light and generating charges are embodied as CMOS (complementary metal oxide semiconductor) image sensors, which have been in practical use. The CMOS image sensors have been widely applied as parts of various types of electronic apparatuses such as digital cameras, video cameras, surveillance cameras, medical endoscopes, personal computers (PCs), mobile phones and other portable terminals (mobile devices).

The CMOS image sensor includes, for each pixel, a photodiode (a photoelectric conversion element) and a floating diffusion (FD) amplifier having a floating diffusion (FD). The mainstream design of the reading operation in the CMOS image sensor is a column parallel output processing of selecting one of the rows in the pixel array and reading the pixels in the selected row simultaneously in the column output direction.

Various types of pixel signal reading (output) circuits have been proposed for CMOS image sensors of the column parallel output scheme. Among them, one of the most advanced circuits is a circuit that includes an analog-to-digital converter (ADC) for each column and obtains a pixel signal in a digital format (see, for example, Japanese Patent Application Publications Nos. 2005-278135 and 2005-295346).

In this CMOS image sensor having column-parallel ADCs (column-wise-AD CMOS image sensor), a comparator compares the pixel signal against a so-called RAMP wave and a counter of a later stage performs digital CDS, so that AD conversion is performed.

This type of CMOS image sensors is capable of transferring signals at high speed, but disadvantageously not capable of reading the signals with a global shutter.

To address this issue, a digital pixel sensor has been proposed that has, in each pixel, an ADC including a comparator (and additionally a memory part), so that the sensor can realize a global shutter according to which the exposure to light can start and end at the same timing in all of the pixels of the pixel array part (see, for example, U.S. Pat. No. 7,164,114 B2 FIG. 4 and US 2010/0181464 A1).

In the case of the above-described digital pixel sensor (DPS), each pixel requires an ADC together with an SRAM bit cell and some pieces of control logic. Here, it is critical to reduce the pixel pitch for the purposes of accomplishing a higher spatial resolution. The SRAM bit cells occupy approximately 30 to 40% of the pixel area in a 10-bit memory in the case of 65 nm process, for example. It should be noted that the SRAM bit cells are scalable to more advanced logic processes such as 40 nm and 22 nm.

Accordingly, the region for the SRAM bit cells is no longer the main contributor. The ADC size is now dominant since it is not easy to reduce the size of the transistors used for the ADC considering the purposes of accomplishing, for example, reduced input conversion noise performance and a widened input common mode range.

It is known that the ADC topology for the smallest size is a single slope ADC, which, in the case of the DPS architecture, requires a comparator inside the pixel and a ramp (RAMP) signal generator outside the pixel array. The transistor for the comparator typically requires a higher voltage level than a pure digital logic circuit and an SRAM bit cell. This results in a significantly larger smallest size W and L. Considering the above, it is critical to reduce the size of the comparator for the purposes of accomplishing a smaller pixel pitch.

In addition to the above characteristics, the comparator for the DPS requires low power consumption and low peak current. Low power consumption is indispensable since all of the pixels in the pixel array operate concurrently. For example, each comparator consumes 1 µA and the pixel array has one mega pixel. In this case, the total power consumption amounts to 1 A (=1 µA×1 mega pixels). This is too high, and adequate ADC function cannot be exhibited if any IR drop occurs in the power supply and ground line. Additionally, low peak current is essential for the same reasons as those to reduce the latch-up, which may be caused by the parasitic diodes in the pixel array.

Another important characteristic is low noise. Global shutter (GS) pixels typically experience a higher dark noise floor than rolling shutter (RS) pixels. The GS CMOS image sensor is not the mainstream technique largely because the dark noise floor is high.

One more important characteristic is whether or not the comparator can use the same power supply as the SRAM bit cell. In order to be capable of using the same power supply, the comparator is required to be capable of operating at low voltage. In this case, excess top metal lines with sufficiently low sheet resistance can be made less necessary. Otherwise, metal line resources are insufficient.

The last requirement is high linearity across the entire input range. In the case of DPS pixels, in particular, the power supply voltage for the comparator drops to, for example, 1.3 V. Furthermore, the manufacturing-induced variation in transistors results in variation in threshold voltage among the individual transistors, which substantially lowers the power supply voltage. An input range of 0.8 V only allows a headroom of only 0.4 V to be used but puts some of the transistors outside the saturation region. Therefore, it is typically difficult to obtain excellent linearity across the entire input range.

A CMOS image sensor having the above-mentioned conventional digital pixel sensor can realize a global shutter function but has only limited success in achieving a wider dynamic range and a higher frame rate since the charges overflowing from the photodiodes in the storing period are not used real time, for example.

One of the key performance indices of the CMOS image sensor is random noise, which mainly originates from the pixels and ADCs as is known in the art. It is generally known that the random noise can be reduced by increasing the transistor size to reduce flicker noise or by adding a capacitor to the output of the comparator to lower the band so that the CDS effectively serves as a noise filter. These techniques alone, however, can not sufficiently reduce the noise since only a small area can be used. As a consequence, the pixel pitch disadvantageously has to increase in order to achieve satisfactory noise characteristics.

Furthermore, since each pixel has an ADC including a comparator (additionally, a memory part), it is difficult to maximize the effective pixel region and the value per cost.

SUMMARY

One object of the present invention is to provide a solid-state imaging device, a method for driving a solid-state imaging device, and an electronic apparatus that are obtained using digital pixels each of which is constituted by an ADC including a comparator that is characterized by low power consumption and low peak current, that is capable of operating at low voltage, and that is capable of realizing high linearity across the entire input range. One object of the present invention is to provide a solid-state imaging device, a method for driving a solid-state imaging device, and an electronic apparatus that are obtained using digital pixels each of which is constituted by an ADC including a comparator that is characterized by low power consumption and low peak current, that is capable of operating at low voltage, that is capable of realizing high linearity across the entire input range and that is capable of substantially achieving a widened dynamic range and an enhanced frame rate. One object of the present invention is to provide a solid-state imaging device, a method for driving a solid-state imaging device, and an electronic apparatus that are obtained using digital pixels each of which is constituted by an ADC including a comparator that is characterized by low power consumption and low peak current, that is capable of operating at low voltage, that is capable of realizing high linearity across the entire input range, that is capable of substantially achieving a widened dynamic range and an enhanced frame rate, and that is capable of achieving reduced noise and maximizing the effective pixel region and the value per cost.

A first aspect of the present invention provides a solid-state imaging device including a pixel part having a pixel arranged therein, where the pixel performs photoelectric conversion, and a reading part for reading a pixel signal from the pixel in the pixel part. The pixel has a photoelectric conversion element for storing therein, in a storing period, charges generated by the photoelectric conversion, a transfer element for transferring, in a transfer period following the storing period, the charges stored in the photoelectric conversion element, an output node to which the charges stored in the photoelectric conversion element are transferred through the transfer element, an output buffer part for converting the charges in the output node into a voltage signal at a level determined by the amount of the charges and outputting the voltage signal, and a comparator for performing, for analog-to-digital (AD) conversion, a comparing operation of comparing the voltage signal output from the output buffer part against a referential voltage to output a digital comparison result signal. The comparator includes a first amplifier including a differential amplifying part constituted by transistors one of which receives the referential voltage fed to a gate thereof and the other of which receives the voltage signal from the output buffer part fed to a gate thereof, where the differential amplifying part performs a comparing operation between the referential voltage and the voltage signal and inverts an output level when the referential voltage and the voltage signal become equal in level, and the differential amplifying part is connected to a current-controllable current source, a second amplifier including an amplifying part for inverting a level of an inverted output from the first amplifier, subjecting the result to gain-up and outputting the result, where the second amplifier is current-controllable, a first inverter for inverting the output from the second amplifier and outputting the result, where the first inverter is current-controllable, and a second inverter for inverting the output from the first inverter and outputting the result, where the second inverter is current-controllable.

A second aspect of the present invention provides a method for driving a solid-state imaging device. The solid-state imaging device includes a pixel part having a pixel arranged therein, where the pixel performs photoelectric conversion, and a reading part for reading a pixel signal from the pixel in the pixel part. The pixel has a photoelectric conversion element for storing therein, in a storing period, charges generated by the photoelectric conversion, a transfer element for transferring, in a transfer period following the storing period, the charges stored in the photoelectric conversion element, an output node to which the charges stored in the photoelectric conversion element are transferred through the transfer element, an output buffer part for converting the charges in the output node into a voltage signal at a level determined by the amount of the charges and outputting the voltage signal, and a comparator for performing, for analog-to-digital (AD) conversion, a comparing operation of comparing the voltage signal output from the output buffer part against a referential voltage to output a digital comparison result signal. The comparator includes a first amplifier including a differential amplifying part constituted by transistors one of which receives the referential voltage fed to a gate thereof and the other of which receives the voltage signal from the output buffer part fed to a gate thereof, where the differential amplifying part performs a comparing operation between the referential voltage and the voltage signal and inverts an output level when the referential voltage and the voltage signal become equal in level, and the differential amplifying part is connected to a current-controllable current source, a second amplifier including an amplifying part for inverting a level of an inverted output from the first amplifier, subjecting the result to gain-up and outputting the result, where the second amplifier is current-controllable, a first inverter for inverting the output from the second amplifier and outputting the result, where the first inverter is current-controllable, and a second inverter for inverting the output from the first inverter and outputting the result, where the second inverter is current-controllable. The first amplifier, the second amplifier, the first inverter and the second inverter are current-controlled such that low power consumption and low peak current are achieved, and bias current is used to control a bandwidth of the comparator.

A third aspect of the present invention provides an electronic apparatus including a solid-state imaging device, and an optical system for forming a subject image on the solid-state imaging device. The solid-state imaging device includes a pixel part having a pixel arranged therein, where the pixel performs photoelectric conversion, and a reading part for reading a pixel signal from the pixel in the pixel part. The pixel has a photoelectric conversion element for storing therein, in a storing period, charges generated by the photoelectric conversion, a transfer element for transferring, in a transfer period following the storing period, the charges stored in the photoelectric conversion element, an output node to which the charges stored in the photoelectric conversion element are transferred through the transfer element, an output buffer part for converting the charges in the output node into a voltage signal at a level determined by the amount of the charges and outputting the voltage signal, and a comparator for performing, for analog-to-digital (AD) conversion, a comparing operation of comparing the voltage signal output from the output buffer part against a referential voltage to output a digital comparison result signal. The comparator includes a first amplifier including a differential amplifying part constituted by transistors one of which receives the referential voltage fed to a gate thereof and the other of which receives the voltage signal from the output buffer part fed to a gate thereof, where the differential amplifying part performs a comparing operation between the referential voltage and the voltage signal and inverts an output level when the referential voltage and the voltage signal become equal in level, and the differential amplifying part is connected to a current-controllable current source, a second amplifier including an amplifying part for inverting a level of an inverted output from the first amplifier, subjecting the result to gain-up and outputting the result, where the second amplifier is current-controllable, a first inverter for inverting the output from the second amplifier and outputting the result, where the first inverter is current-controllable, and a second inverter for inverting the output from the first inverter and outputting the result, where the second inverter is current-controllable.

Advantages

According to the present invention, the comparator included in an ADC constituting a digital pixel is characterized by low power consumption and low peak current and capable of operating at low voltage, and high linearity across the entire input range can be realized. According to the present invention, the comparator included in an ADC constituting a digital pixel is characterized by low power consumption and low peak current and capable of operating at low voltage, high linearity across the entire input range can be realized, and a widened dynamic range and an enhanced frame rate can be substantially achieved. According to the present invention, the comparator included in an ADC constituting a digital pixel is characterized by low power consumption and low peak current and capable of operating at low voltage, high linearity across the entire input range can be realized, a widened dynamic range and an enhanced frame rate can be substantially achieved, reduced noise can be achieved, and the effective pixel region and the value per cost can be maximized.

DESCRIPTION OF THE EMBODIMENTS

Embodiments of the present invention will be hereinafter described with reference to the drawings.

First Embodiment

Figure 1:
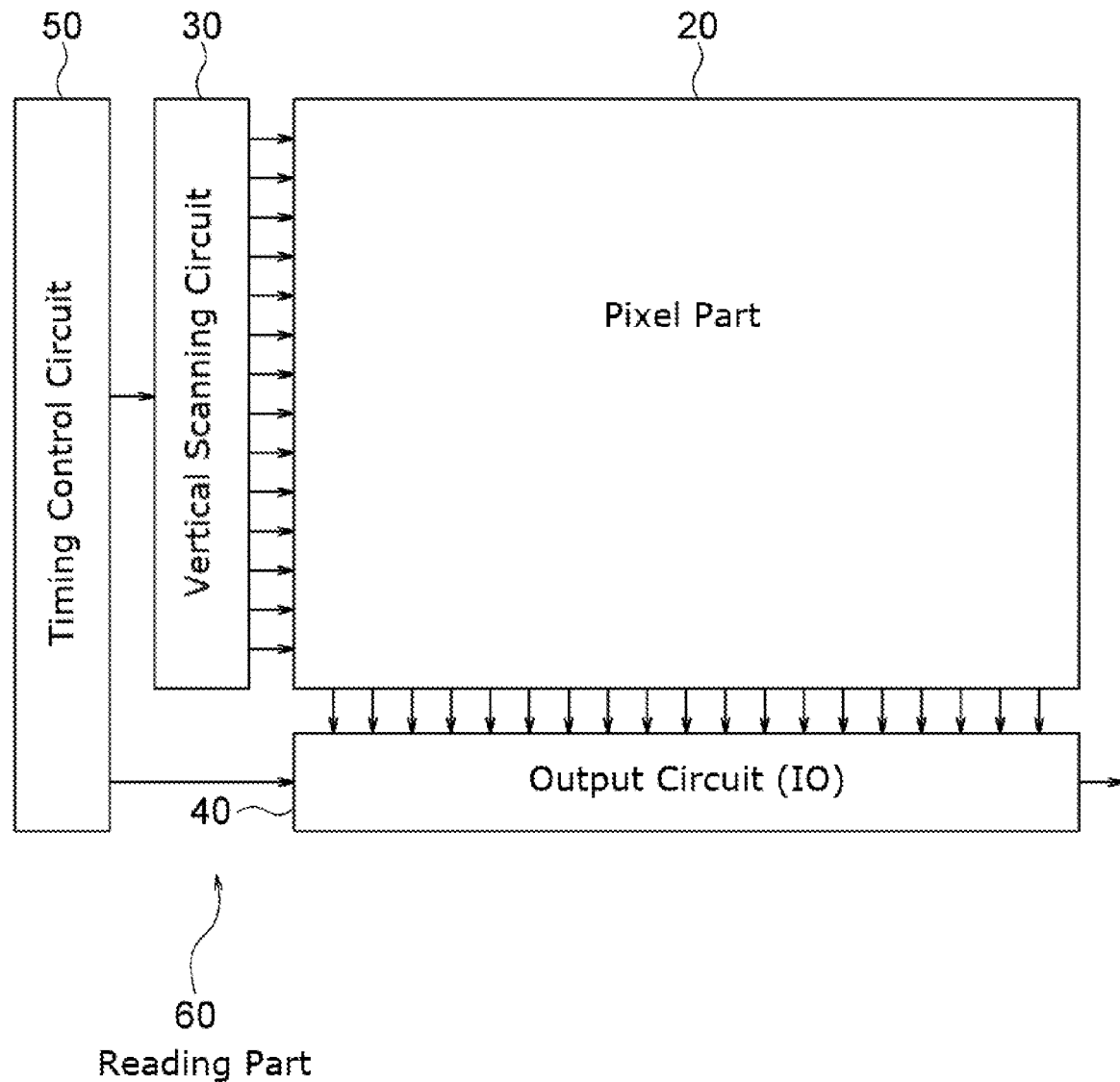
FIG. 1 is a block diagram showing an example configuration of a solid-state imaging device according to a first embodiment of the present invention.

FIG. 1 is a block diagram showing an example configuration of a solid-state imaging device relating to a first embodiment of the present invention. In this embodiment, the solid-state imaging device 10 is constituted by, for example, a CMOS image sensor having a digital pixel as a pixel thereof.

As shown in FIG. 1, the solid-state imaging device 10 is constituted mainly by a pixel part 20 serving as an image capturing part, a vertical scanning circuit (a row scanning circuit) 30, an output circuit 40, and a timing control circuit 50. Among these components, for example, the vertical scanning circuit 30, the output circuit 40, and the timing control circuit 50 constitute a reading part 60 for reading pixel signals.

In the solid-state imaging device 10 relating to the first embodiment, the pixel part 20 includes digital pixels, and each digital pixel includes a photoelectric conversion reading part, an analog-to-digital (AD) converting part, and a memory part. The solid-state imaging device 10 is configured, for example, as a stacked CMOS image sensor capable of operating in a global shutter mode. In the solid-state imaging device 10 relating to the first embodiment, as will be described in detail below, each digital pixel DP has an AD converting function, and the AD converting part includes a comparator for performing a comparing operation of comparing the voltage signal read out by the photoelectric conversion reading part against a referential voltage and outputting a digital comparison result signal. Under the control of the reading part 60, the comparator performs a first comparing operation and a second comparing operation. The first comparing operation is designed to output a digital first comparison result signal obtained by processing the voltage signal corresponding to the overflow charges that overflow from the photoelectric conversion element to the output node (floating diffusion) in a storing period. The second comparing operation is designed to output a digital second comparison result signal obtained by processing the voltage signal corresponding to the charges stored in the photoelectric conversion element that are transferred to the output node in a transfer period following the storing period.

The comparator in the solid-state imaging device 10 relating to the first embodiment employs particular circuit configuration and control technology that can assist in achieving low power consumption, low peak current, low noise, low voltage and a wide input range. The comparator relating to the present embodiment basically includes a first amplifier, a second amplifier, a first inverter and a second inverter. The first amplifier includes a differential amplifying part that is constituted by transistors, one of which receives referential voltage fed to the gate thereof and the other of which receives a voltage signal from an output buffer part fed to the gate thereof, that performs a comparing operation between the referential voltage and the voltage signal, that inverts the output level when the referential voltage and the voltage signal become equal in level, and that is connected to a current-controllable current source. The second amplifier is current-controllable a n d includes an amplifying part that inverts the level of the inverted output from the first amplifier, subjects the result to gain-up and outputs the result. The first inverter is current-controllable and inverts the output from the second amplifier and outputs the result. The second inverter is current controllable and inverts the output from the first inverter and outputs the result. The first amplifier, the second amplifier, the first inverter and the second inverter are current-controlled such that low power consumption and low peak current are realized. In this way, the bandwidth of the comparator is controlled using bias current.

The following outlines the configurations and functions of the parts of the solid-state imaging device 10. In particular, the configurations and functions of the pixel part 20 and the digital pixel and the relating reading operation will be described in detail, and the stacked structure of the pixel part 20 and the reading part 60 and other features will be also described in detail.

<Configurations of Pixel Part 20 and Digital Pixel 200>

Figure 2:
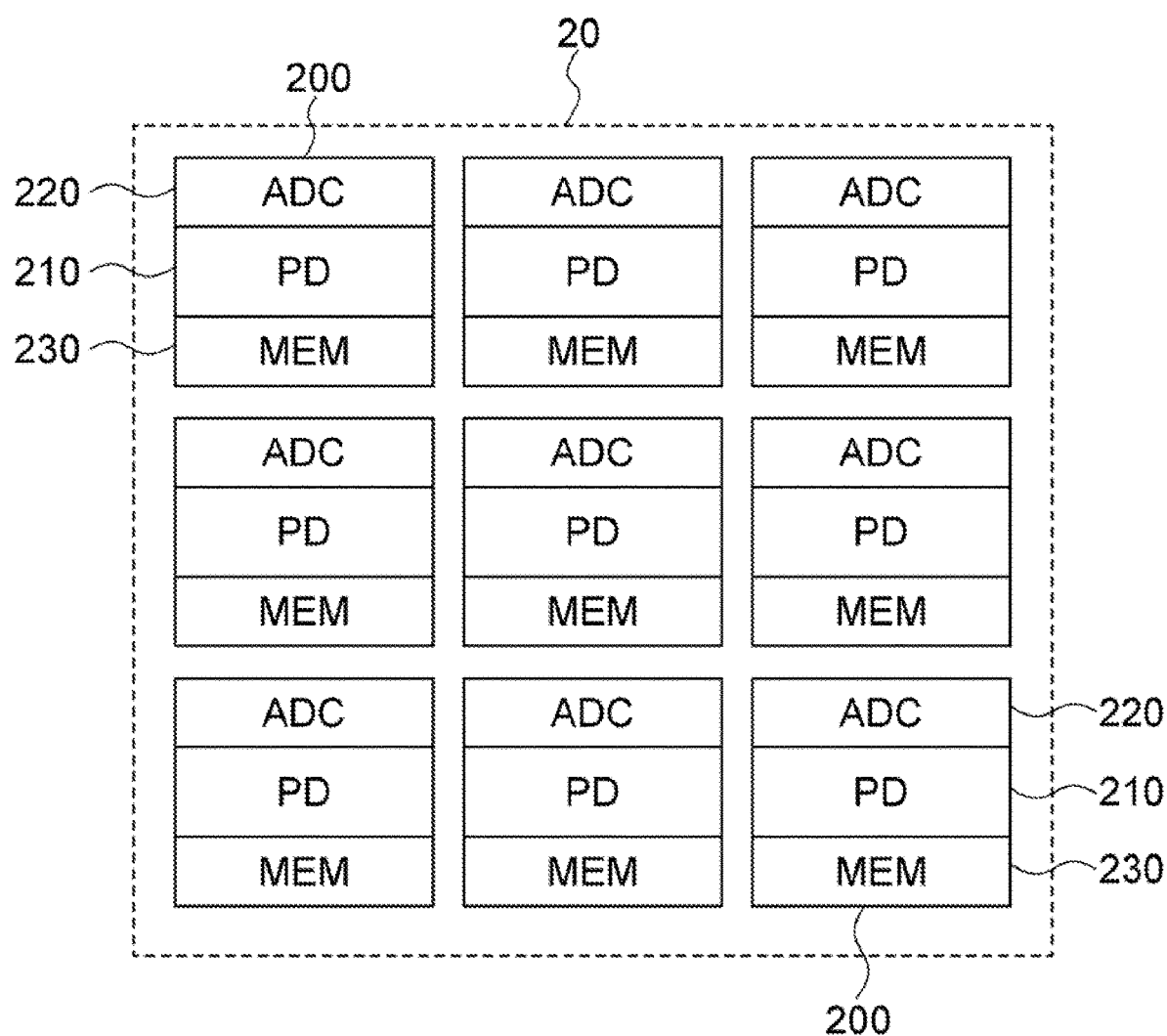
FIG. 2 shows an example of a digital pixel array of a pixel part of the solid-state imaging device relating to the first embodiment of the present invention.
Figure 3:
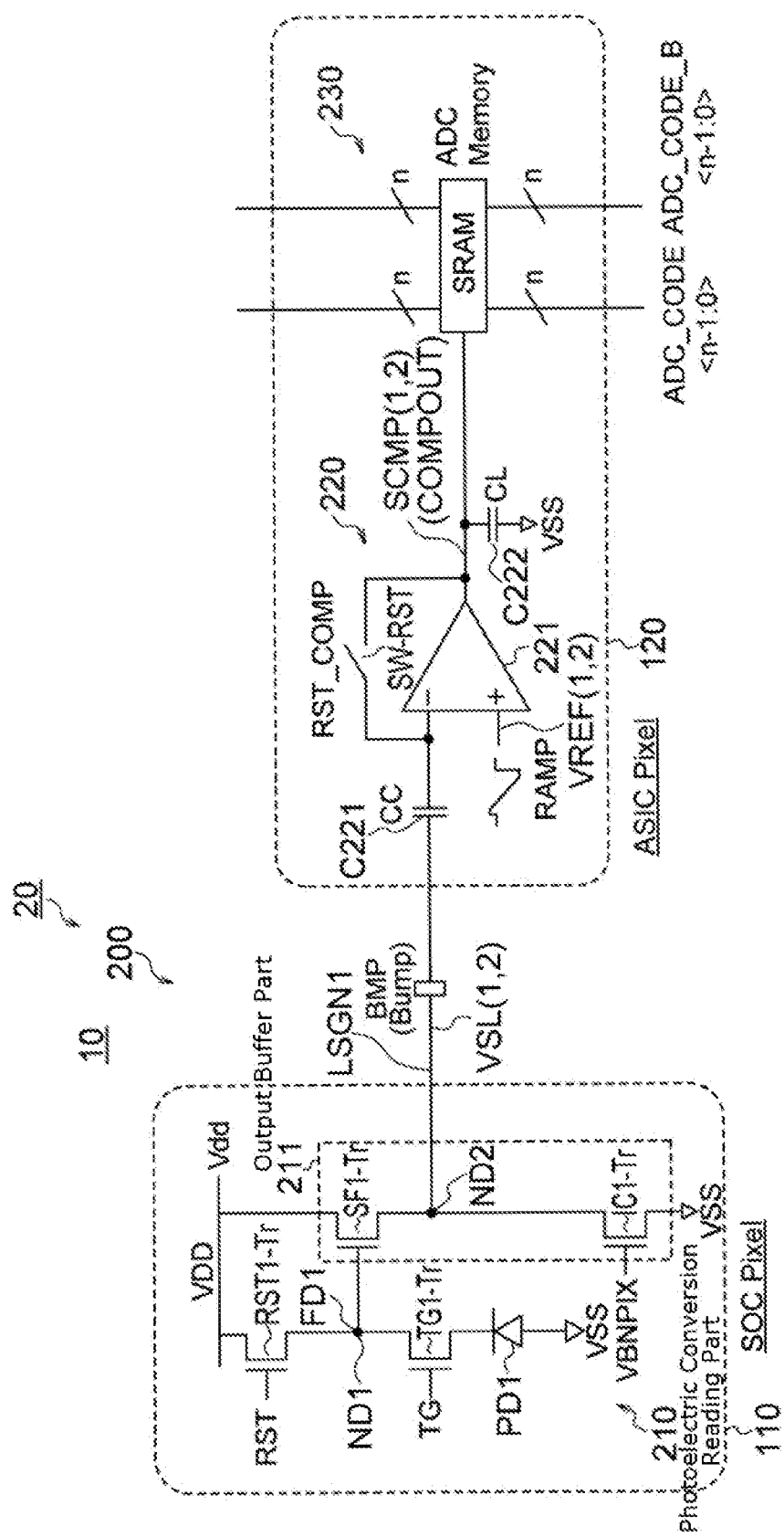
FIG. 3 is a circuit diagram showing an example of a pixel of the solid-state imaging device relating to the first embodiment of the present invention.

FIG. 2 shows an example of the digital pixel array of the pixel part of the solid-state imaging device 10 relating to the first embodiment of the present invention. FIG. 3 is a circuit diagram showing an example of the pixel of the solid-state imaging device 10 relating to the first embodiment of the present invention.

In the pixel part 20, as shown in FIG. 2, a plurality of digital pixels 200 are arranged in a matrix of N rows and M columns. FIG. 2 shows an example where nine digital pixels 200 are arranged in a matrix of three rows and three columns (M=3, N=3) for the sake of simplicity.

The digital pixel 200 relating to the first embodiment includes a photoelectric conversion reading part (identified as "PD" in FIG. 2) 210, an AD converting part (identified as "ADC" in FIG. 2) 220, and a memory part (identified as "MEM" in FIG. 2) 230. The pixel part 20 relating to the first embodiment is configured as a stacked CMOS image sensor made up by a first substrate 110 and a second substrate 120, as will be described in detail below. In the present example, as shown in FIG. 3, the photoelectric conversion reading part 210 is formed in the first substrate 110, and the AD converting part 220 and the memory part 230 are formed in the second substrate 120.

The photoelectric conversion reading part 210 of the digital pixel 200 includes a photodiode (a photoelectric conversion element) and an in-pixel amplifier. More specifically, the photoelectric conversion reading part 210 includes, for example, a photodiode PD1, which is a photoelectric conversion element. For the photodiode PD1, one transfer transistor TG1-Tr serving as a transferring element, one reset transistor RST1-Tr serving as a resetting element, one source follower transistor SF1-Tr serving as a source follower element, one current transistor IC1-Tr serving as a current source element, one floating diffusion FD1 serving as an output node ND1, and one reading node ND2 are provided. As described above, the photoelectric conversion reading part 210 of the digital pixel 200 relating to the first embodiment includes four transistors (4 Tr), namely, the transfer transistor TG1-Tr, the reset transistor RST1-Tr, the source follower transistor SF1-Tr, and the current transistor IC1-Tr.

In the first embodiment, the source follower transistor SF1-Tr, the current transistor IC1-Tr, and the reading node ND2 together constitute an output buffer part 211.

In the photoelectric conversion reading part 210 relating to the first embodiment, the reading node ND2 of the output buffer part 211 is connected to the input part of the AD converting part 220. The photoelectric conversion reading part 210 converts the charges in the floating diffusion FD1 serving as an output node into a voltage signal at a level corresponding to the amount of the charges and outputs the voltage signal VSL to the AD converting part 220.

More specifically, the photoelectric conversion reading part 210 outputs, in a first comparing operation period PCMP1 of the AD converting part 220, a voltage signal VSL corresponding to the overflow charges overflowing from the photodiode PD1, which is a photoelectric conversion element, to the floating diffusion FD1 serving as an output node in a storing period PI.

Furthermore, the photoelectric conversion reading part 210 outputs, in a second comparing operation period PCMP2 of the AD converting part 220, a voltage signal VSL corresponding to the charges stored in the photodiode PD1 that are transferred to the floating diffusion FD1 serving as an output node in the transfer period PT following the storing period PI. The photoelectric conversion reading part 210 outputs a read-out reset signal (signal voltage) (VRST)

and a read-out signal (signal voltage) (VSIG), as a pixel signal, to the AD converting part 220 in the second comparing operation period PCMP2.

The photodiode PD1 generates signal charges (electrons) in an amount determined by the amount of the incident light and stores the same. Description will be hereinafter given of a case where the signal charges are electrons and each transistor is an n-type transistor. However, it is also possible that the signal charges are holes or each transistor is a p-type transistor. Further, this embodiment is also applicable to the case where a plurality of photodiodes and transfer transistors share the transistors.

The photodiode (PD) in each digital pixel 200 is a pinned photodiode (PPD). On a substrate surface for forming the photodiodes (PDs), there is a surface level due to dangling bonds or other defects, and therefore, a lot of charges (dark current) are generated due to heat energy, so that signals fail to be read out correctly. In the case of a pinned photodiode (PPD), a charge storage part of the photodiode (PD) is buried in the substrate to reduce mixing of the dark current into signals.

The transfer transistor TG1-Tr of the photoelectric conversion reading part 210 is connected between the photodiode PD1 and the floating diffusion FD1 and controlled by a control signal TG applied to the gate thereof through a control line. The transfer transistor TG1-Tr remains selected and in the conduction state during a transfer period PT in which the control signal TG is at the high (H) level, to transfer to the floating diffusion FD1 the charges (electrons) produced by the photoelectric conversion and then stored in the photodiode PD1. After the photodiode PD1 and the floating diffusion FD1 are reset to a predetermined reset potential, the transfer transistor TG1-Tr enters the non-conduction state with the control signal TG being set to the low (L) level and the photodiode PD1 enters a storing period PI. Under these circumstances, if the intensity of the incident light is very high (the amount of the incident light is very large), the charges above the well capacity overflow into the floating diffusion FD1 as overflow charges through the overflow pass under the transfer transistor TG1-Tr.

The reset transistor RST1-Tr is connected between the power supply line Vdd of the power supply voltage (sometimes may be referred to as "the power supply potential") VDD and the floating diffusion FD1 and controlled by a control signal RST applied to the gate thereof through a control line. The reset transistor RST1-Tr remains selected and in the conduction state during a reset period in which the control signal RST is at the H level, to reset the floating diffusion FD1 to the potential of the power supply line Vdd of the power supply voltage VDD.

The source follower transistor SF1-Tr serving as a source follower element is connected at the source thereof to the reading node ND2, at the drain thereof to the power supply line Vdd, and at the gate thereof to the floating diffusion FD1. The drain and source of the current transistor IC1-Tr serving as a current source element are connected between the reading node ND2 and the reference potential VSS (for example, GND). The gate of the current transistor IC1-Tr is connected to the feeding line of a control signal VBNPIX. The signal line LSGN1 between the reading node ND2 and the input part of the AD converting part 220 is driven by the current transistor IC1-Tr serving as a current source element.

Figure 4A:
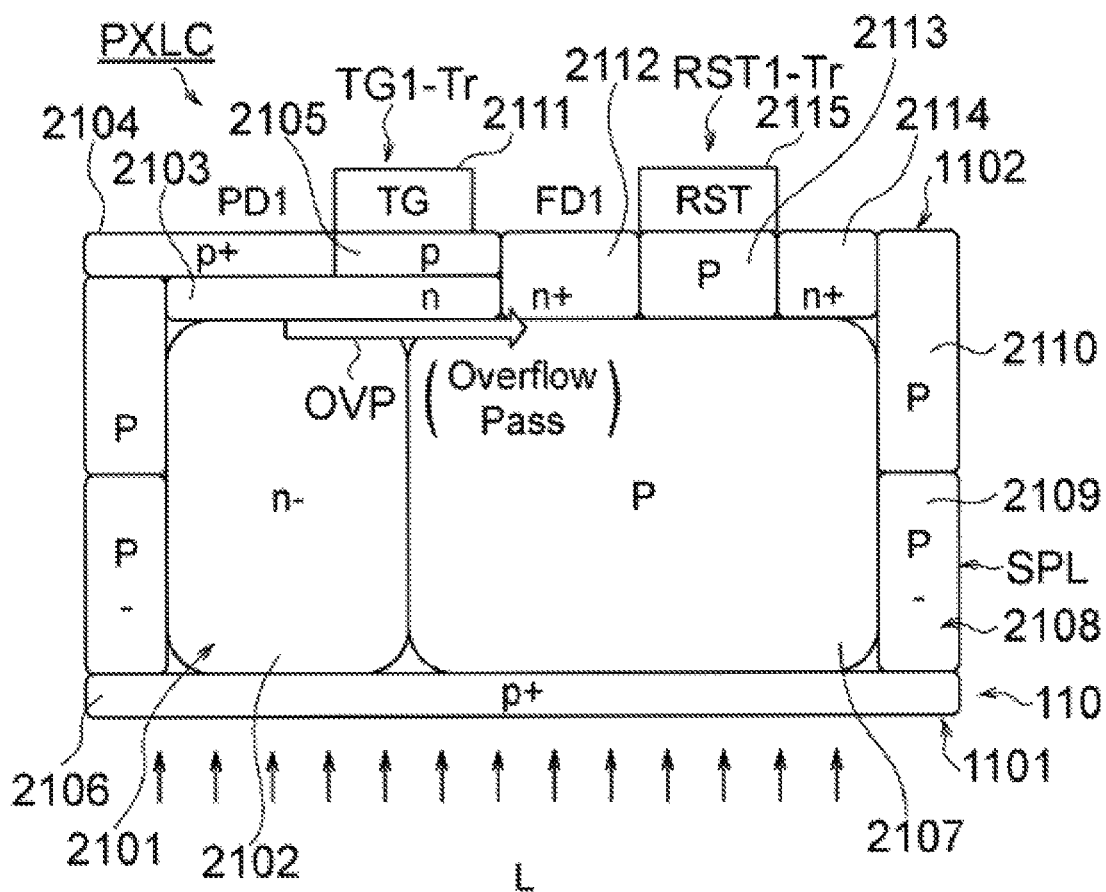
FIG. 4A is a simplified sectional view showing an example configuration of a charge storing and transferring system or the main part of a digital pixel relating to the first embodiment of the present invention.
Figure 4B:
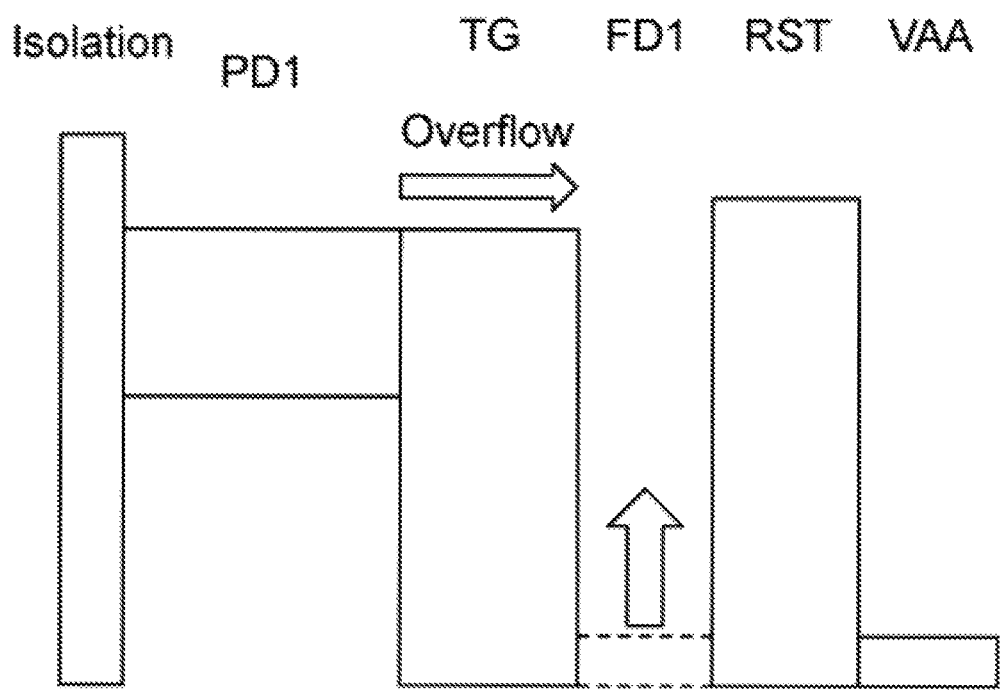
FIG. 4B is a potential diagram showing what happens during an overflow.

FIG. 4A is a simplified sectional view showing an example configuration of a charge storing and transferring system or the main part of the digital pixel relating to the first embodiment of the present invention, and FIG. 4B is a potential diagram showing what happens during an overflow.

Each digital pixel cell PXLC is formed on a substrate (in the present example, the first substrate 110) having a first substrate surface 1101 (for example, back surface) irradiated with light L and a second substrate surface 1102 that opposes the first substrate surface 1101 and defined by a separation layer SPL. The digital pixel cell PLXC shown in FIG. 4A includes the photodiode PD1, the transfer transistor TG1-Tr, the floating diffusion FD1 and the reset transistor RST1-T, which together form the photoelectric conversion reading part 210, the separation layer SPL, and a color filter part and a microlens, which are not shown.

<Configuration of Photodiode>

The photodiode PD1 includes a semiconductor layer of a first conductivity type (in the present embodiment, the n type) (in the present embodiment, the n layer) 2101 that is buried in the semiconductor substrate having the first substrate surface 1101 and the second substrate surface 1102 opposing the first substrate surface 1101, and is capable of photoelectrically convert the received light and storing charges. On the lateral portion of the photodiode PD1 in the direction orthogonal to the normal to the substrate (the X direction), a separation layer SPL of a second conductivity type (in the present embodiment, the p type) is formed.

As described above, in the present embodiment, each digital pixel cell PXLC uses a pinned photodiode (PPD) as the photodiode (PD). On a substrate surface for forming the photodiodes (PDs), there is a surface level due to dangling bonds or other defects, and therefore, a lot of charges (dark current) are generated due to heat energy, so that signals fail to be read out correctly. In the case of a pinned photodiode (PPD), a charge storage part of the photodiode (PD) is buried in the substrate to reduce mixing of the dark current into signals.

In the photodiode PD1 shown in FIG. 4A, the n layer (the first-conductivity-type semiconductor layer) 2101 has a two-layer structure in the normal direction to the substrate 110 (the Z direction in the orthogonal coordinate system shown in FIG. 4A). In the present example, an n− layer 2102 is the closest to the first substrate surface 1101 and an n layer 2103 is closer to the second substrate surface 1102 than the n− layer 2102 is, and a p+ layer 2104 and a p layer 2105 are further formed and positioned closer to the second substrate surface 1102 than then layer 2103 is. Furthermore, a p+ layer 2106 is formed and positioned closer to the first substrate surface 1101 than the n− layer 2102 is. The p+ layer 2106 is formed without a gap and covers not only the photodiode PD1 but also the separation layer SPL and further other digital pixel cells PXLC.

A color filter part is formed on the light incidence surface of the P+ layer 2106, and a microlens is further formed on the light incidence surface of the color filter part in a portion corresponding to the photodiode PD1 and a portion of the separation layer SPL.

The above-described configurations are shown only as examples. A single-layer structure may be employed, or a stacked structure made up by three, four or more layers may be alternatively applied.

<Configuration of Separation Layer in X direction (Column Direction)>

When the p-type separation layer SPL is seen in the X direction (the column direction) in FIG. 4A, a first p layer (a second-conductive-type semiconductor layer) 2107 is formed on the right lateral portion of the n− layer 2102 of the photodiode PD1 in the direction orthogonal to the normal to the substrate (the X direction in the orthogonal coordinate system shown in FIG. 4A). In the p-type separation layer SPL, on the right side of the first p layer 2107 in the X direction, a second p layer (a second-conductivity-type semiconductor layer) 2108 is formed and has a two-layer structure in the normal direction to the substrate 110 (the Z direction in the orthogonal coordinate system shown in FIG. 4A). In the present example, in the second p layer 2108, a p− layer 2109 is closer to the first substrate surface 1101 and a p layer 2110 is closer to the second substrate surface 1102 than the p− layer 2109 is.

The above-described configurations are shown only as examples. A single-layer structure may be employed, or a stacked structure made up by three, four or more layers may be alternatively applied.

Similarly to the photodiode PD1, the p+ layer 2106 is formed on the first p layer 2107 and the second p− layer 2109 of the p-type separation layer SPL on the first substrate surface 1101 side thereof.

An n layer 2103 is formed such that overflow pass OVP partly covers the surface of the first p layer 2107 of the p-type separation layer SPL that faces the second substrate surface 1102. On a p layer 2105 that is formed on the surface of the n layer 2103 that faces the second substrate surface 1102, a gate electrode 2111 of the transfer transistor TG1-Tr is formed with a gate insulator sandwiched therebetween. On the surface of the first p layer 2107 in the p-type separation layer SPL facing the second substrate surface 1102, an n+ layer 2112 is formed, which is to be formed into the floating diffusion FD1, a p layer 2113 is formed adjacent to the n+ layer 2112, which is to be formed into the channel formation region of the reset transistor RST1-Tr, and an n+ layer 2114 is formed adjacent to the p layer 2113. On the p layer 2113, a gate electrode 2115 is formed with a gate insulator sandwiched therebetween.

With the above-described structure, if the intensity of the incident light is very high (the amount of the incident light is very large), the charges above the well capacity overflow into the floating diffusion FD1 as overflow charges through the overflow pass OVP under the transfer transistor TG1-Tr.

The AD converting part 220 of the digital pixel 200 compares the analog voltage signal VSL output from the photoelectric conversion reading part 210 against the referential voltage VREF, which has a ramp waveform varying with a predetermined gradient or a fixed voltage level, to convert the analog signal into a digital signal.

As shown in FIG. 3, the AD converting part 220 includes a comparator (COMP) 221, an input-side coupling capacitor C221, an output-side load capacitor C222, and a reset switch SW-RST.

In the comparator 221, a first input terminal or inversion input terminal (−) receives a voltage signal VSL fed thereto, which is output from the output buffer part 211 of the photoelectric conversion reading part 210 to the signal line LSGN1, and a second input terminal or non-inversion input terminal (+) receives the referential voltage VREF fed thereto. The comparator 221 performs a comparing operation of comparing the voltage signal VST against the referential voltage VREF and outputting a digital comparison result signal SCMP.

The first input terminal or inversion input terminal (−) of the comparator 221 is connected to a coupling capacitor C221. In this way, the output buffer part 211 of the photoelectric conversion reading part 210 formed on the first substrate 110 is AC coupled to the input part of the comparator 221 of the AD converting part 220 formed on the second substrate 120, so that the noise can be reduced and high SNR can be achieved when the illuminance is low.

As for the comparator 221, the reset switch SW-RST is connected between the output terminal and the first input terminal or inversion input terminal (−), and the load capacitor C222 serving as a noise bandwidth limiting capacitor is connected between the output terminal and the reference potential VSS.

In the AD converting part 220, basically, the comparator 221 compares the analog signal (the potential VSL) read from the output buffer part 211 of the photoelectric conversion reading part 210 to the signal line LSGN1 against the referential voltage VREF, for example, a ramp signal RAMP that linearly changes with a certain gradient or has a slope waveform. During the comparison, the counter (not shown), which is provided for each column, is operating. The ramp signal RAMP having a ramp waveform and the value of the counter vary in a one-to-one correspondence, so that the voltage signal VSL is converted into a digital signal. Basically, the AD converting part 220 converts a change in voltage, in other words, a change in the referential voltage VREF (for example, the ramp signal RAMP) into a change in time, and counts the change in time at certain intervals (with certain clocks). In this way, a digital value is obtained. When the analog signal VSL and the ramp signal RAMP (the referential voltage VREF) cross each other, the output from the comparator 221 is inverted, the clock input into the counter is stopped or the suspended clock is input into the counter, and the value (data) of the counter at that timing is saved in the memory part 230. In this way, the AD conversion is completed. After the end of the above-described AD converting period, the data (signal) stored in the memory part 230 of each digital pixel 200 is output through the output circuit 40 to a signal processing circuit (not shown) and subject to predetermined signal processing, so that a two-dimensional image is produced.

<First and Second Comparing Operations in Comparator 221>

The comparator 221 of the AD converting part 220 of the first embodiment is driven and controlled by the reading part 60 to perform the following two types of or first and second comparing operations during a pixel signal reading period.

When performing the first comparing operation CMPR1, under the control of the reading part 60, the comparator 221 outputs a digital first comparison result signal SCMP1 obtained by processing a voltage signal VSL1 corresponding to the overflow charges overflowing from the photodiode PD1, which is a photoelectric conversion element, to the floating diffusion FD1, which is an output node, in the storing period PI. The first comparing operation CMPR1 may be referred to as a time stamp ADC mode operation.

When performing the second comparing operation CMPR2, under the control of the reading part 60, the comparator 221 outputs a digital second comparison result signal SCMP2 obtained by processing a voltage signal VSL2 (VSIG) corresponding to the charges stored in the photodiode PD1 that are transferred to the floating diffusion FD1, which is an output node, in the transfer period PT following the storing period PI. In the second comparing operation CMPR2, actually, before the voltage signal VSL2 (VSIG) corresponding to the stored charges is converted into a digital signal, a voltage signal VSL2 (VRRT) corresponding to the reset voltage in the floating diffusion FD1 at the time of resetting is converted into a digital signal. The second comparing operation CMPR2 may be referred to as a linear ADC mode operation.

In the present embodiment, the storing period PI basically denotes the period from when the photodiode PD1 and the floating diffusion FD1 are reset to the reset level to when the transfer transistor TG1-Tr is switched to the conduction state and the transfer period PT starts. The period PCMPR1 for the first comparing operation CMPR1 denotes the period from when the photodiode PD1 and the floating diffusion FD1 are reset to the reset level to when the floating diffusion FD1 is reset to the reset level before the transfer period PT starts. The period PCMPR2 for the second comparing operation CMPR2 denotes the period that starts after the floating diffusion FD1 is reset to the reset level and that includes a period after the transfer period PT.

Figure 5:
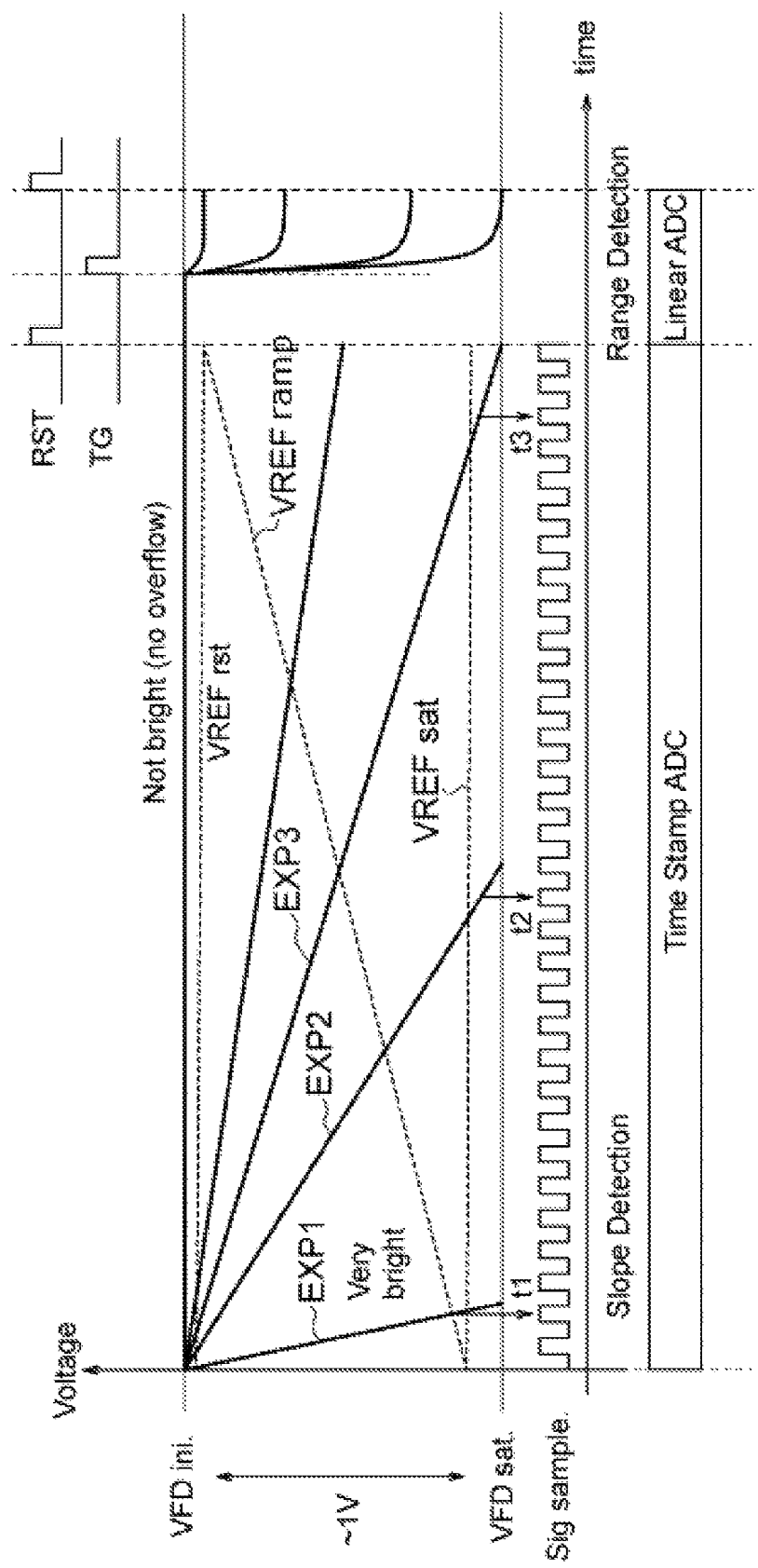
FIG. 5 is used to illustrate a first comparing operation performed by a comparator relating to the first embodiment of the present invention.

The following describes in more detail the first comparing operation CMPR1. FIG. 5 is used to illustrate the first comparing operation CMPR1 performed by the comparator 221 relating to the first embodiment of the present invention. In FIG. 5, the horizontal axis represents the time and the vertical axis represents the voltage level VFD of the floating diffusion FD1, which is an output node.

As for the voltage level VFD of the floating diffusion FD1, the smallest amount of charges and the highest voltage level VFDini can be observed when the floating diffusion FD1 is at the reset level. On the other hand, a large amount of charges and a low voltage level VFDsat are observed when the floating diffusion FD1 is saturated. Considering these, the referential voltage VREF1 for the comparator 221 is set to voltage VREFsat, which is a fixed level observed at the timing of non-saturation before the saturation is reached, or set to ramp voltage VREFramp, which varies from the voltage level VREFrst at the timing of resetting to the voltage level VREFsat.

If the referential voltage VREF1 is set to the level VREFsat or VREFramp during the first comparing operation CMPR1, the time required to flip (invert) the output of the comparator 221 decreases as the intensity of the incident light or illuminance increases as shown in FIG. 5. This is because the amount of charges increases as the intensity of the incident light or illuminance increases. In an example case EXP1 where the illuminance is of the highest level, the output of the comparator 221 is flipped (inverted) immediately at a timing t1. In an example case EXP2 where the illuminance is lower than in the example case EXP1, the output of the comparator 221 is flipped (inverted) at a timing t2 later than the timing t1. In an example case EXP3 where the illuminance is lower than in the example case EXP2, the output of the comparator 221 is flipped(inverted) at a timing t3 later than the timing t2.

As described above, as a result of the first comparing operation CMPR1, the comparator 221 outputs the first comparison result signal SCMP1 corresponding to the time determined by the amount of the overflow charges from the photodiode PD1 to the floating diffusion FD1 in a predetermined period of time within the storing period PI.

To be more specific, in the first comparing operation CMPR1, the comparator 221 is capable of comparing the light level against the referential voltage as long as the light level produces the signal level ranging (i) from the signal level corresponding to a predetermined threshold value of the photodiode PD1 obtained with a maximum value of the sampling time that is required to cause the overflow charges to start overflowing from the photodiode PD1 to the floating diffusion FD1, which is an output node, (ii) to the signal level obtained with a minimum value of the sampling time.

As described above, the photo conversion operation in the time stamp ADC mode involves light to time conversion and is performed in the storing period PI. As shown in FIG. 5, in the case of very bright light, the output of the comparator 221 is flipped immediately after the reset activation period, and this light level corresponds to a saturation signal (a well capacity) described as the following equation.

((FD Saturation Amount×Storing Time)/Sampling Period)+ PD Saturation Amount

For example, a case is assumed where the FD saturation amount is 8 Ke-at 150 uV/e-(the FD capacitance of 1.1 fF), the minimum sampling time is 15 nsec, and the storing time is 3 msec.

This time stamp ADC operation mode is, as described above, capable of comparing the light level against the reference level as long as the light level produces the signal level ranging (i) from the signal level corresponding to a predetermined threshold value of the photodiode PD1 obtained with a maximum value of the sampling time that is required to cause the overflow charges to start overflowing from the photodiode PD1 to the floating diffusion FD1, which is an output node, (ii) to the signal level obtained with a minimum value of the sampling time.

Figure 6:
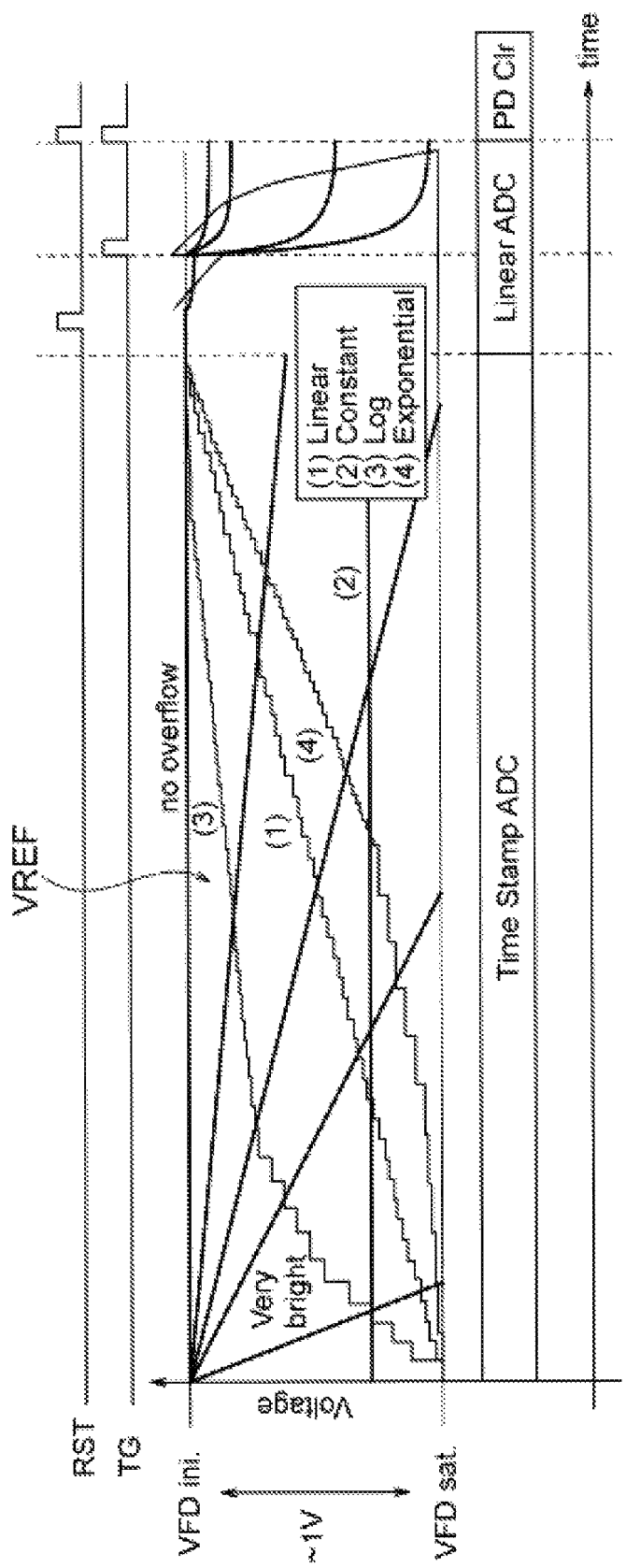
FIG. 6 is used to illustrate the first comparing operation performed by the comparator relating to the first embodiment and shows other examples of the pattern of a referential voltage.

FIG. 6 is used to illustrate the first comparing operation CMPR1 performed by the comparator 221 relating to the first embodiment and shows other examples of the pattern of the referential voltage.

The referential voltage VREF may be a voltage signal having a ramp waveform (signal) RAMP that varies with a predetermined gradient indicated by the number (1) in FIG. 6, a voltage signal having a fixed voltage DC indicated by the number (2) in FIG. 6, a log voltage signal indicated by the number (3) in FIG. 6 or an exponential voltage signal indicated by the number (4) in FIG. 6.

Figure 7:
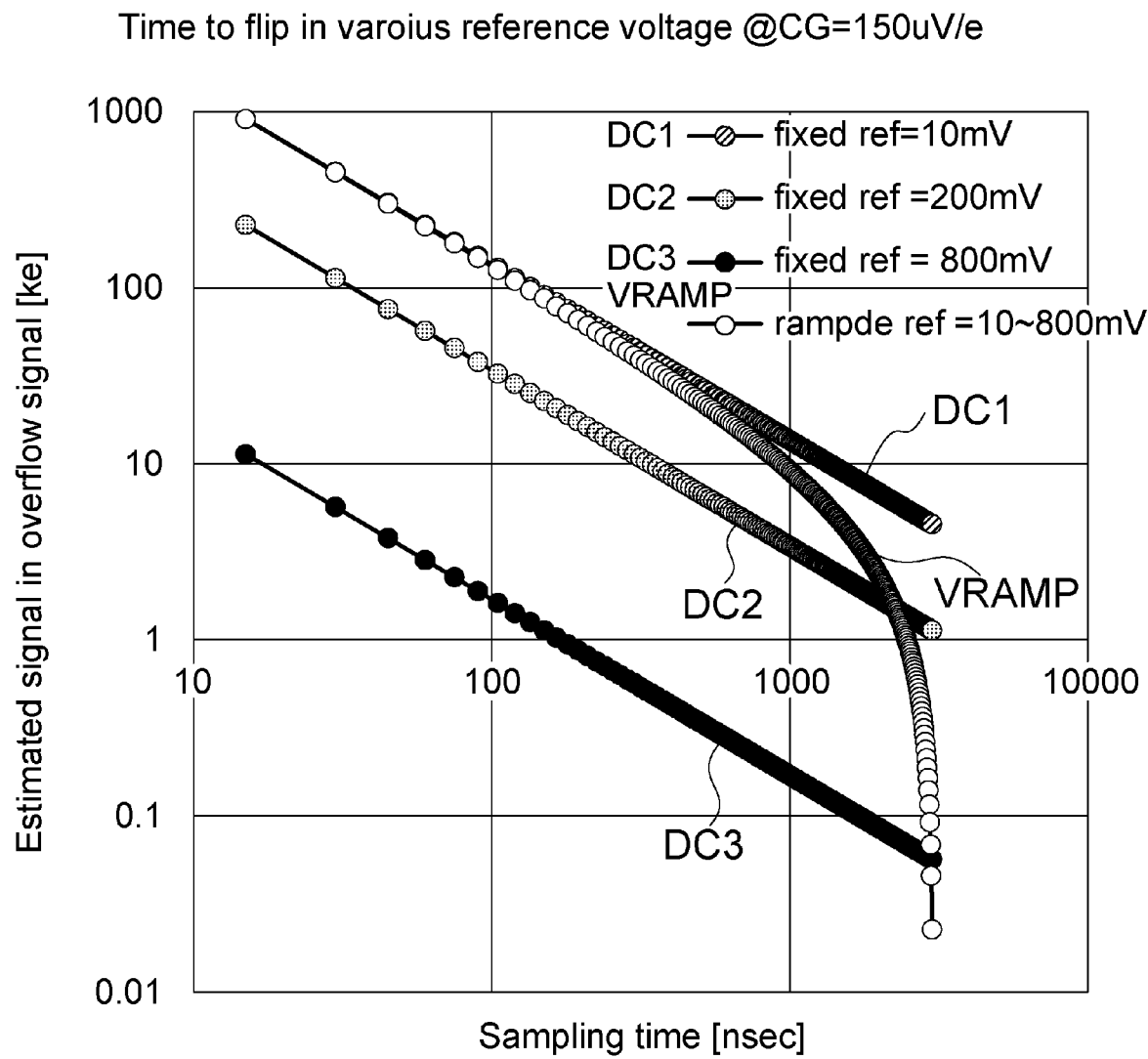
FIG. 7 shows the result of the light to time conversion when the referential voltage input into the comparator relating to the first embodiment is varied in level.

FIG. 7 shows the result of the light to time conversion when the referential voltage VREF input into the comparator relating to the first embodiment is varied in level. In FIG. 7, the horizontal axis represents the sampling time, and the vertical axis represents the estimated signal in the overflow signal.

FIG. 7 shows a sampling time required to flip the output of the comparator 221 corresponding to the overflow charges (signal). FIG. 7 shows the sampling time required to flip for various fixed reference voltage levels DC1, DC2, DC3 and a ramp reference voltage VRAMP. In this example, a linear reference ramp is used.

On completion of the above-described time stamp ADC mode operation in which the first comparing operation CMPR1 for the saturated overflow charges is performed, the floating diffusion FD1 and the comparator 221 are reset, and the linear ADC mode subsequently starts, in which the second comparing operation CMPR2 for the non-saturated charges is performed.

Figure 8:
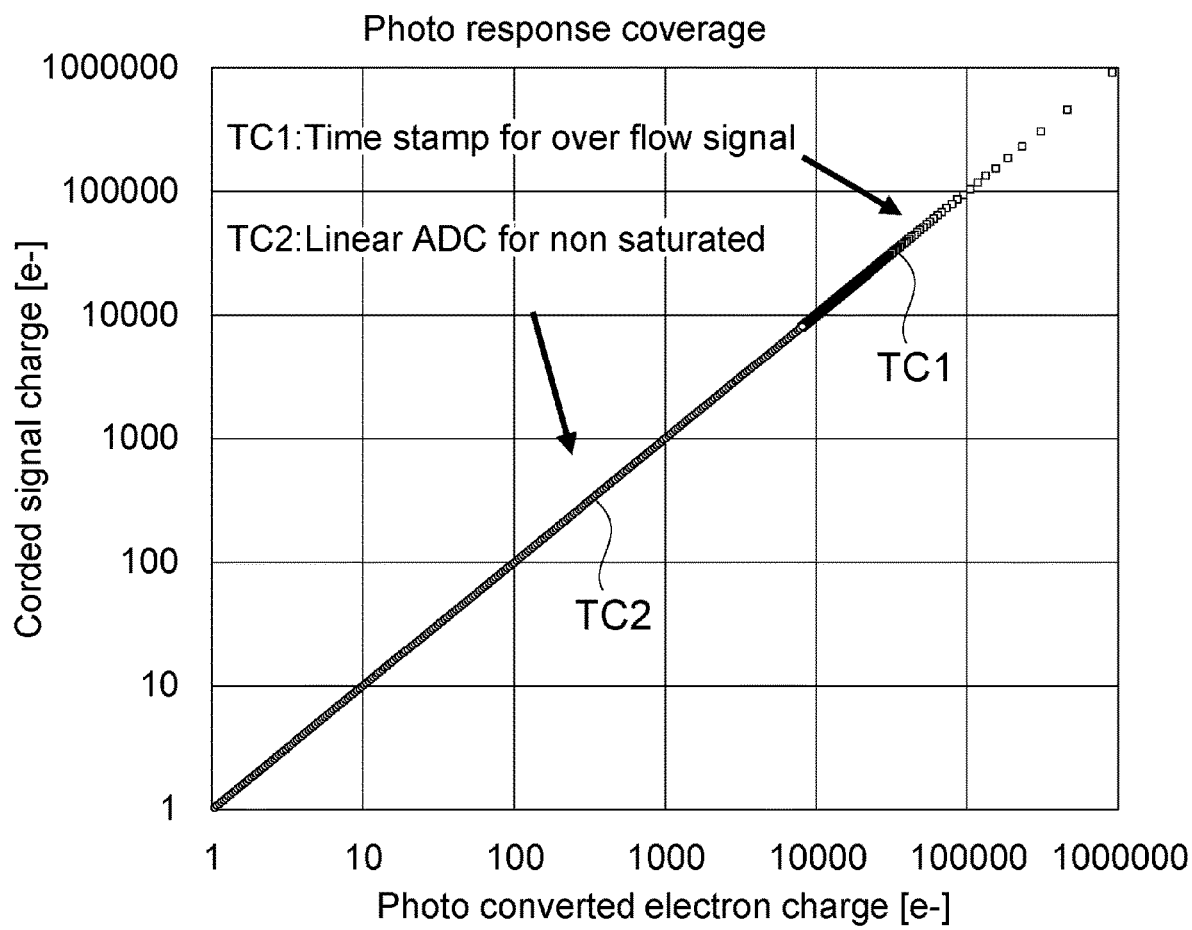
FIG. 8 shows photo response coverages in the digital pixel relating to the first embodiment of the present invention.

FIG. 8 shows photo response coverages in the digital pixel relating to the first embodiment of the present invention. In FIG. 8, "TC1" represents the signal obtained in the time stamp ADC mode operation and "TC2" represents the signal obtained in the linear ADC mode.

The time stamp ADC mode can provide photo response for very bright light, and the linear ADC mode can provide photo response for dark light. For example, a dynamic range of 120 dB can be realized. For example, the saturation signal within the photo conversion range is equivalent to 900 Ke, as described above. Since the linear ADC mode involves a normal reading operation employing ADC, the linear ADC mode can cover the range from 2 e or the noise level to 8 Ke where the photodiode PD1 and the floating diffusion FD1 are saturated. The coverage provided by the linear ADC mode can be increased to 30 Ke by adding a switch and a capacitor.

<Example Configuration of Comparator>

The comparator 221 relating to the first embodiment employs such circuit configuration and control technology that can achieve low power consumption, low peak current, low noise, low voltage and a wide input range. The comparator 221 relating to the present embodiment includes a first amplifier, a second amplifier, a first inverter and a second inverter that are non-cascade connected, and is current-controlled such that low power consumption and low peak current can be achieved, and uses bias current to control the bandwidth.

The following describes in detail the configuration and function of the comparator 221, which characterizes the present embodiment. In the present embodiment, the first conductivity type is the p or n channel, and the second conductivity type is the n or p channel. In the following, the comparator is assigned with a reference number 700.

Figure 9:
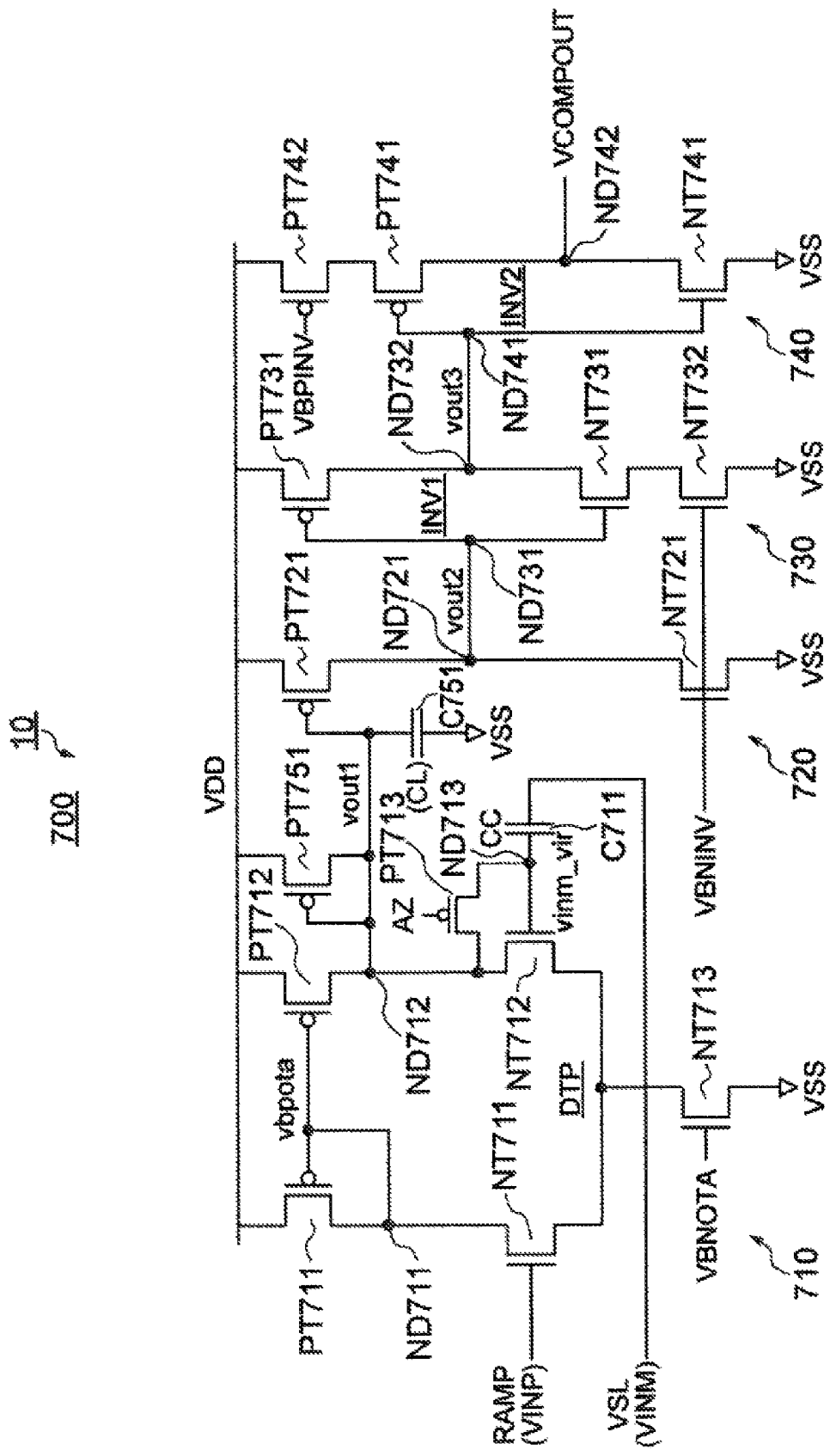
FIG. 9 is a circuit diagram showing an example configuration of the comparator relating to the first embodiment.

FIG. 9 is a circuit diagram showing an example configuration of the comparator relating to the first embodiment.

The comparator 700 includes, as shown in FIG. 9, a first amplifier 710, a second amplifier 720, a first inverter 730, a second inverter 740, a clamp PMOS transistor PT751, and a first noise bandwidth limiting capacitor C751, which are non-cascade connected.

The first amplifier 710 includes p-channel MOS (PMOS) transistors PT711 to PT713, n-channel MOS (NMOS) transistors NT711 to NT713, and an autozero (AZ) capacitor C711 (CC) serving as a sampling capacitor with an AZ level.

The source of the PMOS transistor PT711 and the source of the PMOS transistor PT712 are connected to the power supply potential VDD. The drain of the PMOS transistor PT711 is connected to the drain of the NMOS transistor NT711, and the connecting point therebetween forms a node ND711. The drain and gate of the PMOS transistor PT711 are connected, and the connecting point therebetween is connected to the gate of the PMOS transistor PT712. The drain of the PMOS transistor PT712 is connected to the drain of the NMOS transistor NT712, and the connecting point therebetween forms the output node ND712 of the first amplifier 710. The source of the NMOS transistor NT711 is connected to the source of the NMOS transistor NT712, and the connecting point therebetween is connected to the drain of the NMOS transistor NT713. The source of the NMOS transistor NT713 is connected to the reference potential (for example, the ground potential) GND.

The gate of the NMOS transistor NT712 is connected to a first electrode of the capacitor C711, and the connecting point therebetween forms a node ND713. A second electrode of the capacitor C711 is connected to the input line for the analog signal VSL. The gate of the NMOS transistor NT713 is connected to the input line for a bias control signal (gate bias voltage) VBNNOTA. The PMOS transistor PT713 is connected at the source thereof to the node ND712 and at the drain thereof to the node ND713. The gate of the PMOS transistor PT713 is connected to the input line for a signal AZ, which is active when at the Low level.

In the first amplifier 710 having the above-described configuration, the PMOS transistors PT711 and PT712 constitute a current mirror circuit, and the NMOS transistors NT711 and NT712 constitute a differential transistor pair DTP that uses the NMOS transistor NT713 as the current source. The PMOS transistor PT713 serves as an AZ switch, and the capacitor C711 serves as a sampling capacitor for the AZ level. The output signal vout1 from the first amplifier 710 is output from the output node ND712 to the second amplifier 720.

In the present embodiment, the output node ND712 of the first amplifier 710 is connected to a clamp PMOS transistor PT751 (first-conductivity-type field effect transistor), which is diode-connected. Specifically speaking, the source of the PMOS transistor PT751 is connected to the power supply potential VDD, and the gate and drain are connected to the output node ND712 of the first amplifier 710.

The second amplifier 720 includes a PMOS transistor PT721 and an NMOS transistor NT721.

The PMOS transistor PT721 is connected at the source thereof to the power supply potential VDD and at the gate thereof to the output node ND712 of the first amplifier 710. The drain of the PMOS transistor PT721 is connected to the drain of the NMOS transistor NT721, and the connecting point therebetween forms an output node ND721. The source of the NMOS transistor NT721 is connected to the reference potential VSS (ground potential GND). The gate of the NMOS transistor NT721 is connected to the input line for a bias control signal (gate bias voltage) VBNINV.

In the second amplifier 720 having the above-described configuration, the PMOS transistor PT721 constitutes the input and amplifying circuit. The NMOS transistor NT721 performs current control. The second amplifier 720 serves as an amplifying part for inverting the level of the inverted output from the first amplifier 710, subjecting the result to gain-up, and outputting the result to the first inverter 730.

The first noise bandwidth limiting capacitor C751 has a first electrode connected to the gate (input) of the PMOS transistor PT721 serving as a source grounded amplifier and a second electrode connected to the reference potential VSS. The capacitor C751 is equivalent to the result of connecting the source-grounded input to the capacitance multiplied by the gain. The capacitance that appears to be the output from the first amplifier 710 is multiplied by the gain of the PMOS transistor PT721. Therefore, the capacitance of the capacitor C751 can be allowed to be small. In this way, the band of the comparator 700 is significantly narrowed by the small capacitance.

The first inverter 730 includes a PMOS transistor PT731 and an NMOS transistor NT731 that together form an inverter INV1 and a current-controlling NMOS transistor NT732. The gate of the PMOS transistor PT731 is connected to the gate of the NMOS transistor NT731 to form an input node ND731, and their drains are connected to form an output node ND732. The source of the PMOS transistor PT731 is connected to the power supply potential VDD, the source of the NMOS transistor NT731 is connected to the drain of the current-controlling NMOS transistor NT732, and the source of the NMOS transistor NT732 is connected to the reference potential VSS. The gate of the NMOS transistor NT732 is connected to the input line for the bias control signal (gate bias voltage) VBNINV.

The second inverter 740 includes a PMOS transistor PT741 and an NMOS transistor NT741 that together form an inverter INV2 and a current-controlling PMOS transistor PT742. The gate of the PMOS transistor PT741 is connected to the gate of the NMOS transistor NT741 to form an input node ND741, and their drains are connected to form an output node ND742. The source of the NMOS transistor NT741 is connected to the reference potential VSS, the source of the PMOS transistor PT741 is connected to the drain of the current-controlling PMOS transistor PT742, and the source of the PMOS transistor PT742 is connected to the power supply potential VDD. The gate of the PMOS transistor PT742 is connected to the input line for the bias control signal (gate bias voltage) VBPINV. The output node ND742 of the second inverter 740 is connected to the output terminal of the comparator 700 (221).

As described above, the comparator 700 (221) employs such circuit configuration and control technology that can achieve low power consumption, low peak current, low noise, low voltage and wide input range. The following examines the circuit configuration and other characteristics of the comparator 700 shown in FIG. 9.

The comparator 700 (221) relating to the present embodiment is a simple mutual conductance amplifier (OTA) including two stages of preamplifiers followed by the two current-controlled inverters 730 and 740, which enables the same low power supply voltage as used by the SRAM bit cells to be used and a small footprint to be accomplished. This arrangement can improve the DC gain up to ~80 dB, which is sufficiently high to achieve an ADC resolution of 12 bits. In addition, the above arrangement can provide an array of pixels having low power consumption, low peak current and a large pixel format.

The first amplifier 710 uses the AZ capacitor C711(CC) and the PMOS transistor PT713 serving as an autozero (AZ) switch for performing analog correlated double sampling that maximizes the input common-mode range under the condition of lower power supply voltage by obtaining only the signal amplitude level of the output resulting from the photoelectric conversion. In other words, the signal amplitude of the output resulting from the photoelectric conversion is the result of multiplying the difference between the reset level of the floating diffusion and the potential at the floating diffusion after the signal charges are transferred by the voltage gain of the pixel source follower (SF). The offset mismatch (~100 mVpp) between the preamplifiers is removed, and the input signal range is further widened. The reset noise of the floating diffusion and the offset of the photodiode pixel source follower (SF) are removed, which contributes to reduce the noise and widen the input range. As described above, the AZ capacitor C711 can contribute to achieve low-noise performance, low voltage and widened input range.

The preamplifiers 710 and 720 of the two stages and the following two consecutive inverters 730 and 740 are all current-controlled such that low power consumption and low peak current are realized. A trade-off can be made between the noise and the comparator speed by controlling the bandwidth of the comparator using the bias current. This is beneficial to more than one comparator operation mode.

The last stage of the comparator 700 or second inverter 740 is controlled by a PMOS current source formed by the PMOS transistor PT742, and the NMOS transistor NT741 is completely turned on. This enables a low level (ground level) to be propagated more swiftly and strongly from the comparator to the word line (WL) of the SRAM bit cell, so that the access transistor connected to the word line can be blocked. In this way, what is saved in the SRAM bit cell is prevented from being overwritten via the bit line (BL), and the ADC code is frozen.

The output from the first amplifier 710 is clamped by the diode-connected PMOS transistor PT751. When the ramp signal RAMP is initialized to the signal VINP, the output is clamped to the middle level (0.6 to 0.8 V) between the power supply (1.3 V) and the ground (0 V) irrespective of the input swing. This phenomenon defines the swing range to be from the clamp voltage to the threshold voltage of the preamplifier of the second stage. Accordingly, the transition voltage on the clamped node stays the same irrespective of the input swing. This results in no dependence on the input range and can accomplish high linearity.

In other words, the diode-connected PMOS transistor PT751 provided for clamping limits the swing in the output signal vout1 that adjusts the transition voltage irrespective of the input swing. The output signal vout1 constantly changes from the clamped voltage to the threshold voltage of the PMOS transistor PT721 of the second amplifier 720. This mechanism removes the dependence on the input and thus can achieve high linearity across the entire input range.

Figure 10:
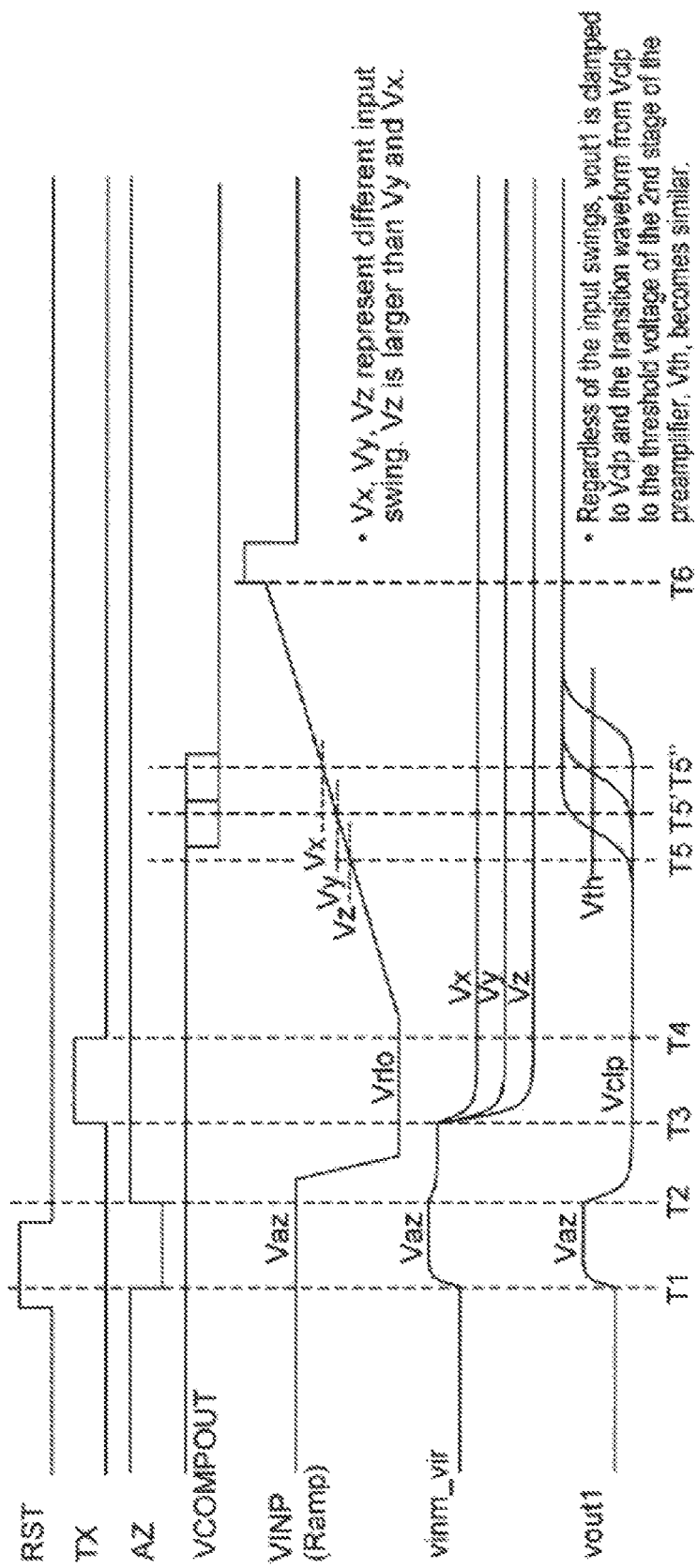
FIG. 10 is a timing chart to illustrate how the pixel and comparator relating to the first embodiment of the present invention operate.

FIG. 10 is a timing chart to illustrate how the pixel and comparator relating to the first embodiment of the present invention operate.

The period from the timing T1 to the timing T2 is an autozeto period. The voltage vinm_vir of the gate of the other NMOS transistor NT712 of the differential transistor pair DTP of the first amplifier 710 settles at the voltage Vaz, which is set by the ramp signal RAMP (VINP). When the signal AZ is switched to the High level and the PMOS transistor PT713 serving as an AZ switch is switched to the non-conduction state, the voltage vinm_vir is affected by the charge injection and clock feed-through.

In the period from the timing T2 to the timing T3, the ramp voltage RAMP (VINP) is initialized to the voltage Vrlo. The output signal vout1 from the first amplifier 710 is clamped, and there is no change in voltage. Therefore, the voltage voutm_vir is not affected.

In the period from the timing T3 to the timing T4, the charges are transferred from the photodiode PD1 to the floating diffusion FD1, and the voltage vinm_vir accordingly changes. The output signal vout1 from the first amplifier 710, however, remains the same.

The period from the timing T4 to the timing T6 is a ramp period. If the signal RAMP (VINP) crosses the voltage vinm_vir at the voltage level Vx, the output SCMP (VCOMPOUT) from the comparator 700 (221) is inverted and the ADC code is fixed in the memory (not shown).

In FIG. 10, the output signal vout1 from the first amplifier 710 is clamped to the voltage level Vclp irrespective of the input swing, and the transition waveform Vth from Vclp to the threshold voltage of the preamplifier of the second stage becomes similar.

<Configuration of Memory Part>

The memory part 230 is formed using an SRAM 231 serving as an ADC memory, and an ADC code is written into and read from the memory part 230 under control of the reading part 60.

Figure 11A:
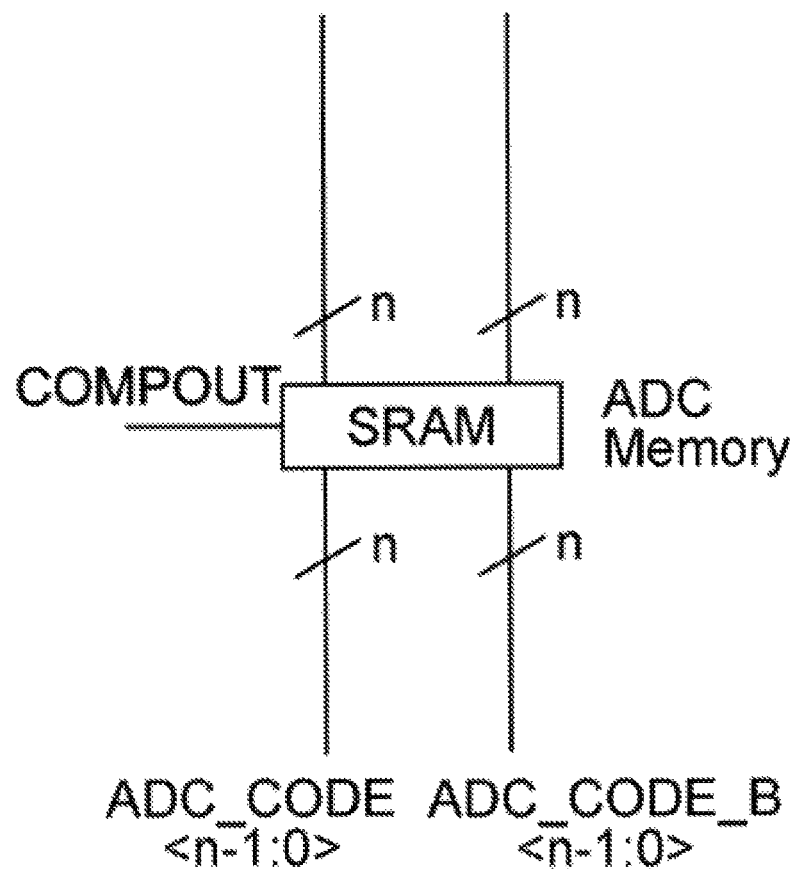
FIGS. 11A to 11C show an example of an SRAM bit cell serving as an ADC code memory.
Figure 11B:
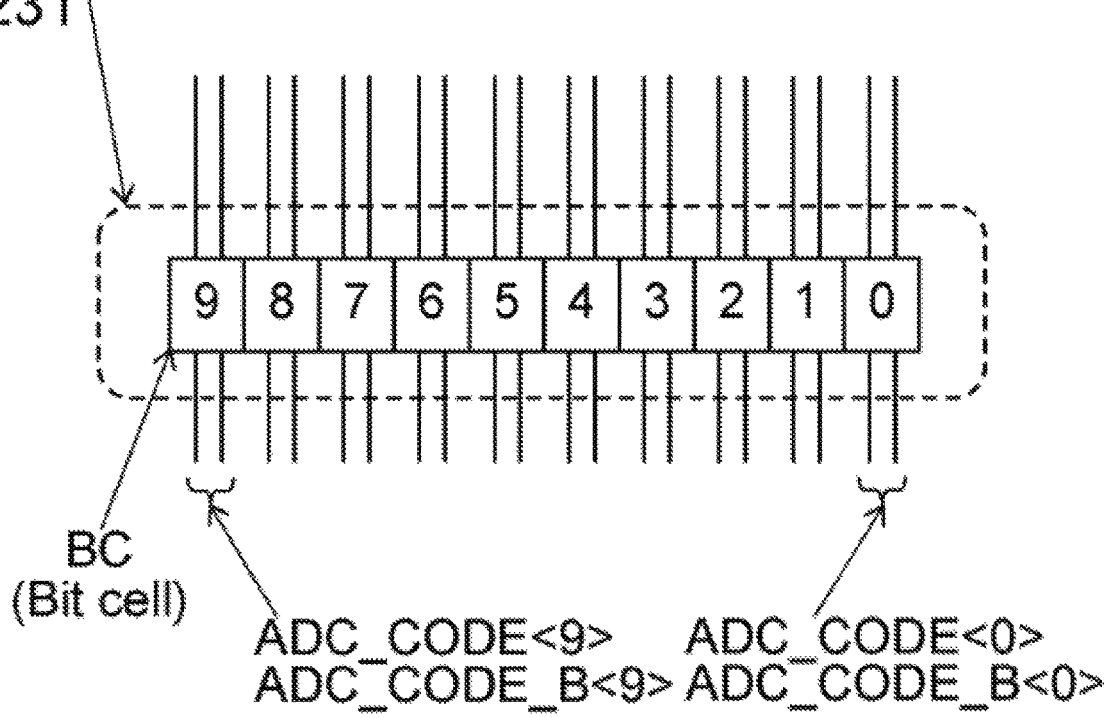
Figure 11C:
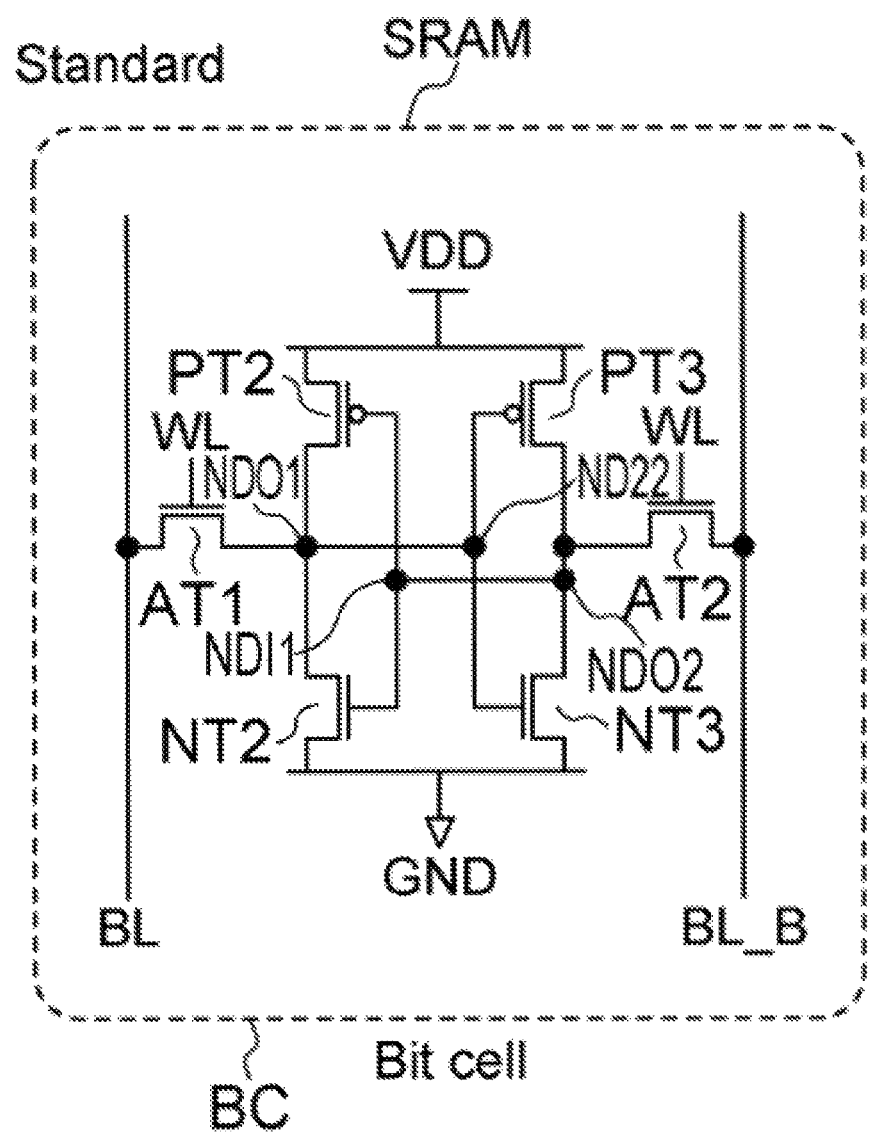

FIGS. 11A to 11C show an example of a SRAM bit cell serving as an ADC code memory.

As shown in FIGS. 11A to 11C, the ADC memory is constituted by an SRAM bit cell, and reading and writing operations are performed on the ADC memory using both an ADC_CODE and its inverted signal (ADC_CODE_B) fed to the ADC memory. FIGS. 11A to 11C show a 10-bit ADC memory. A normal SRAM bit cell uses 6 standard transistors, as shown in FIG. 11C.

The SRAM 231 of the memory part 230 saves, in the form of digital data, the digital first comparison result signal SCMP1 that is obtained as a result of the first comparing operation CMPR1 in the comparator 221 by processing the voltage signal corresponding to the overflow charges in the floating diffusion FD1 and the digital second comparison result signal SCMP2 obtained as a result of the second comparing operation CMPR2 by processing the charges stored in the photodiode PD1, in a correlative manner. As described above, the memory part 230 is formed by an SRAM, receives digital signals fed thereto, is compatible with photo conversion codes, and can be read by an external IO buffer in the output circuit 40 near the pixel array.

Figure 12:
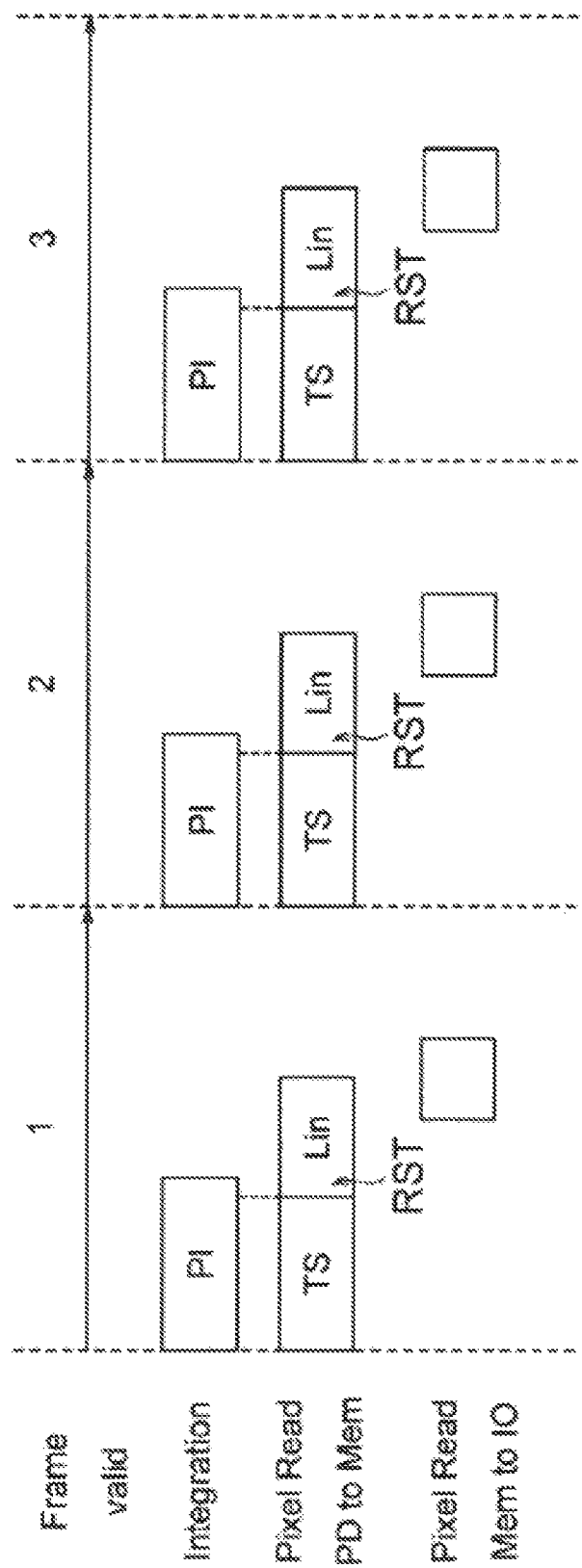
FIG. 12 shows an example sequence of operations performed in a frame reading operation by the solid-state imaging device relating to the first embodiment of the present invention.

FIG. 12 shows an example sequence of operations performed in a frame reading scheme by the solid-state imaging device 10 relating to the first embodiment of the present invention. The following first describes an example of the frame reading scheme in the solid-state imaging device 10. In FIG. 12, TS denotes the period in which the time stamp ADC is performed, and Lin denotes the period in which the linear ADC is performed.

As described above, the overflow charges are stored in the floating diffusion FD1 in the storing period PI. The solid-state imaging device 10 operates in the time stamp ADC mode within the storing period PI. Actually, the solid-state imaging device 10 operates in the time stamp ADC mode within a period that is included in the storing period PI and lasts until the floating diffusion FD1 is reset. On completion of the operation in the time stamp ADC mode, the solid-state imaging device 10 enters the linear ADC mode, so that the signal (VRST) in the floating diffusion FD1 at the time of resetting is read and converted into a digital signal to be stored in the memory part 230. After the end of the storing period PI, in the linear ADC mode, the signal (VSIG) corresponding to the charges stored in the photodiode PD1 is read and converted into a digital signal to be stored into the memory part 230. The read frame is sent outside of the solid-state imaging device 10 (the image sensor) via the IO buffer of the output circuit 40, for example, which is driven by reading the digital signal data from the memory node and has such an MIPI data format. This operation can be globally performed in the pixel array.

In the pixel part 20, the reset transistor RST1-Tr and the transfer transistor TG1-Tr are used to reset the photodiode PD1 concurrently in all of the pixels, so that exposure to light starts concurrently in parallel in all of the pixels. After a predetermined exposure period (the storing period PI) ends, the transfer transistor TG1-Tr is used to sample the output signal from the photoelectric conversion reading part 210 in the AD converting part 220 and the memory part 230, so that the exposure ends concurrently in parallel in all of the pixels. This successfully accomplish a perfect electronic shutter.

The vertical scanning circuit 30 drives the photoelectric conversion reading part 210 of the digital pixel 200 through row-scanning control lines in shutter and reading rows, under the control of the timing control circuit 50. The vertical scanning circuit 30 feeds referential voltage levels VREF1, VREF2 that are set in accordance with the first and second comparing operations CMPR1, CMPR2, to the comparator 221 of each digital pixel 200, under the control of the timing control circuit 50. Further, the vertical scanning circuit 30 outputs, according to an address signal, row selection signals indicating the row addresses of the reading row from which signals are to be read out and the shutter row in which the charges stored in the photodiodes PD are to be reset.

The output circuit 40 includes an IO buffer 41 arranged in correspondence with the output from the memory in each of the digital pixels 200 in the pixel part 20 and outputs the digital data read from each digital pixel 200 to outside.

The timing control circuit 50 generates timing signals required for signal processing in the pixel part 20, the vertical scanning circuit 30, the output circuit 40, and the like.

In the first embodiment, the reading part 60 controls the reading of the pixel signal from the digital pixel 200 in, for example, the global shutter mode.

<Stacked Structure of Solid-State Imaging Device 10>

The following describes the stacked structure of the solid-state imaging device 10 relating to the first embodiment.

Figure 13A:
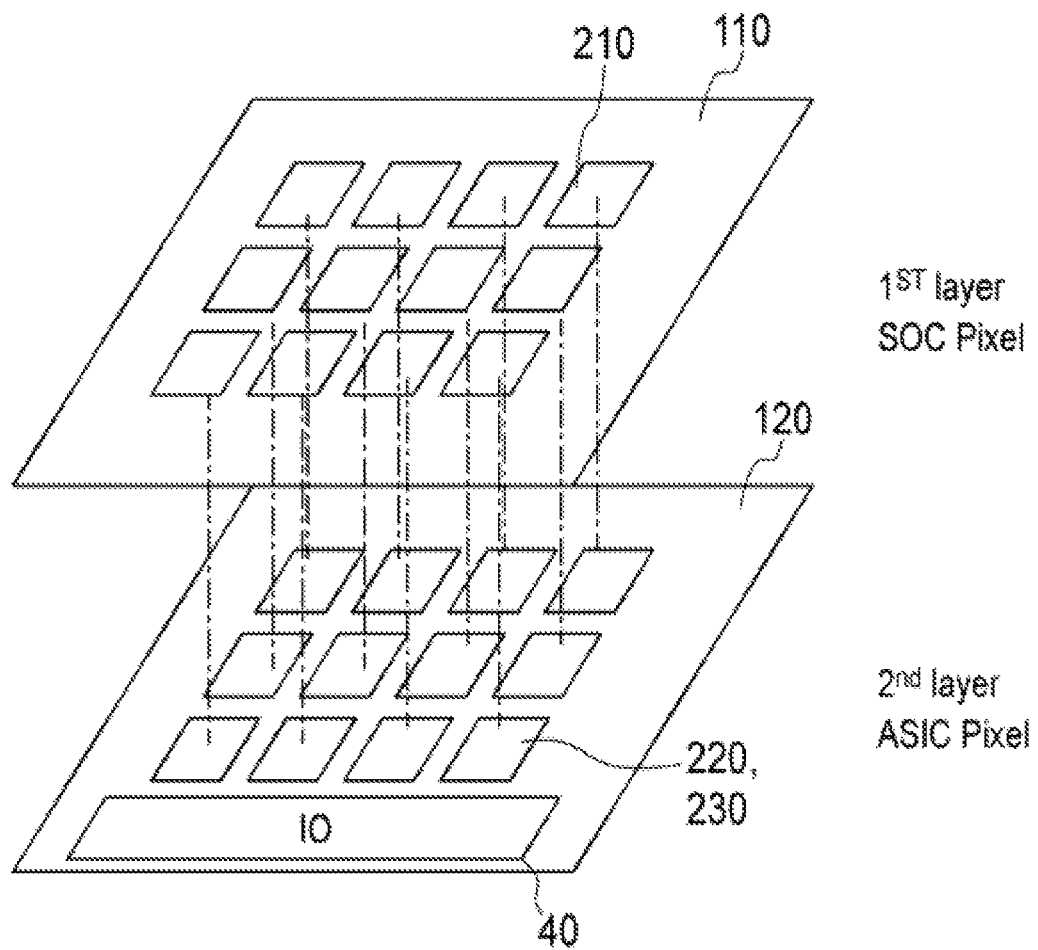
FIGS. 13A and 13B are schematic views to illustrate the stacked structure of the solid-state imaging device relating to the first embodiment.
Figure 13B:
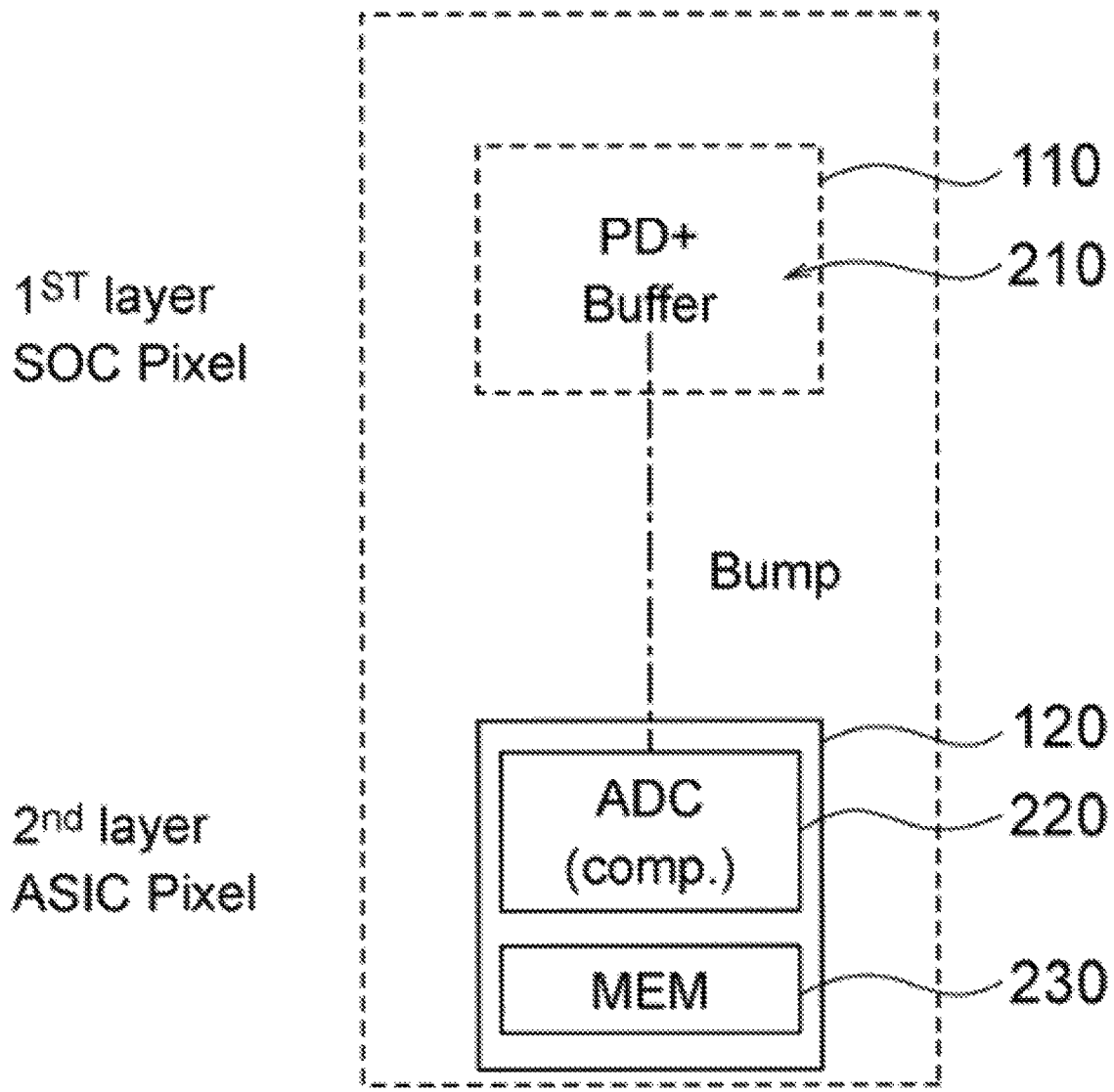
Figure 14:
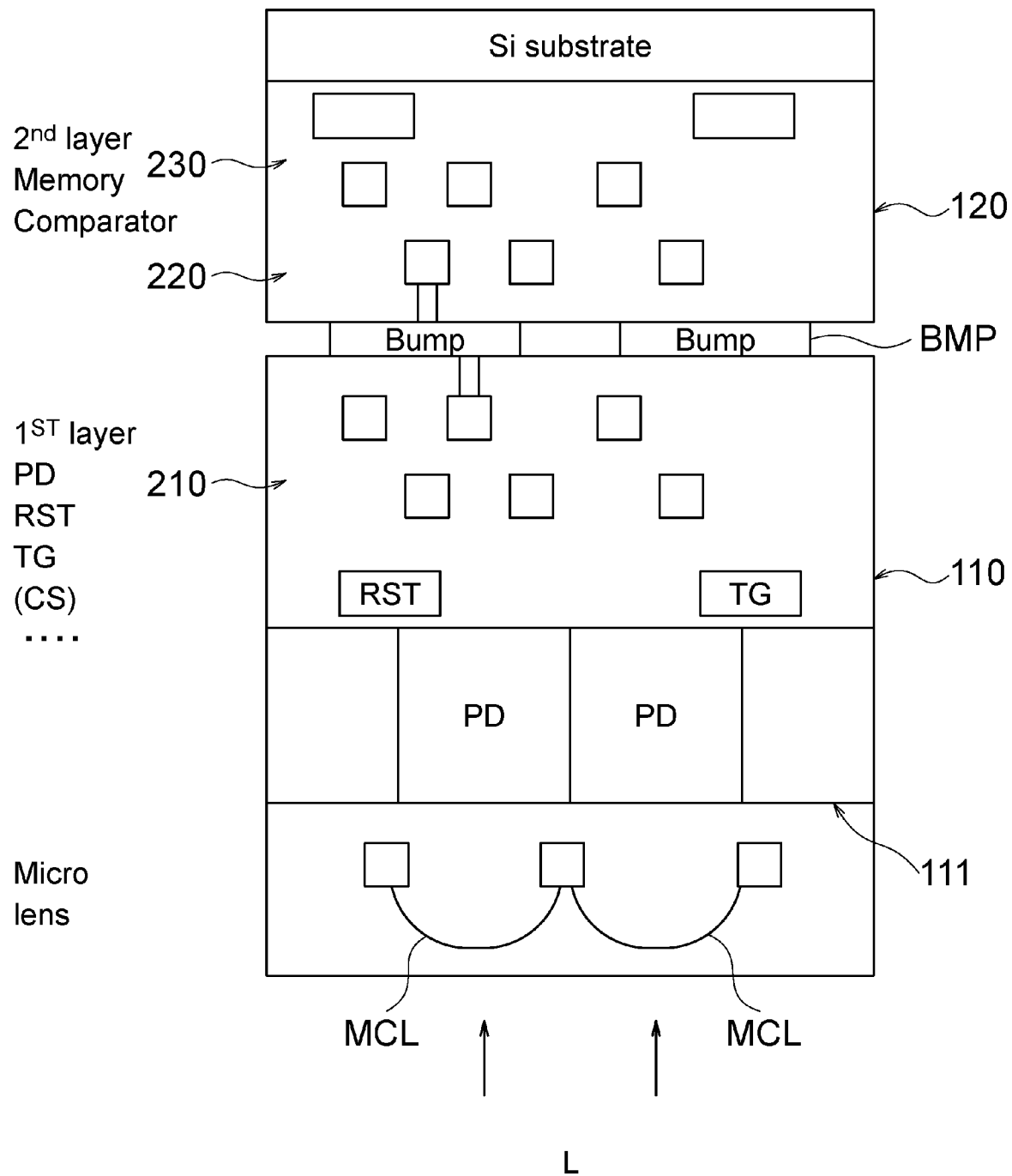
FIG. 14 is a simplified sectional view to illustrate the stacked structure of the solid-state imaging device relating to the first embodiment.

FIGS. 13A and 13B are schematic views to illustrate the stacked structure of the solid-state imaging device 10 relating to the first embodiment. FIG. 14 is a simplified sectional view to illustrate the stacked structure of the solid-state imaging device 10 relating to the first embodiment.

The solid-state imaging device 10 relating to the first embodiment has a stacked structure of a first substrate (an upper substrate) 110 and a second substrate (a lower substrate) 120. The solid-state imaging device 10 is formed as an imaging device having a stacked structure that is obtained, for example, by bonding wafers together and subjecting the bonded wafers to dicing. In the present example, the first substrate 110 and the second substrate 120 are stacked.

In the first substrate 110, the photoelectric conversion reading parts 210 of the digital pixels 200 of the pixel part 20 are arranged and centered around the central portion of the first substrate 110. In the first substrate 110, the photodiode PD is formed on a first surface 111 side thereof onto which light L is incident. On the light incident surface of the photodiode PD, a microlens MCL and a color filter are formed. In the first substrate 110, the transfer transistor TG1-Tr, the reset transistor RST1-Tr, the source follower transistor SF1-Tr, and the current transistor IC1-Tr are formed on a second surface side thereof.

As described above, basically in the first embodiment, the photoelectric conversion reading parts 210 of the digital pixels 200 are arranged in a matrix pattern in the first substrate 110.

In the second substrate 120, the AD converting parts 220 and the memory parts 230 of the digital pixels 200 are arranged in a matrix pattern. In the second substrate 120, the vertical scanning circuit 30, output circuit 40 and timing control circuit 50 may be also formed.

In the above-described stacked structure, the reading nodes ND2 of the photoelectric conversion reading parts 210 in the first substrate 110 are electrically connected to the inversion input terminals (−) of the comparators 221 of the digital pixels 200 in the second substrate 120 through vias (die-to-die vias), microbumps BMP, the signal lines LSGN1 or the like as shown in FIG. 3, for example. Furthermore, in the present embodiment, the reading nodes ND2 of the photoelectric conversion reading parts 210 in the first substrate 110 are AC coupled to the inversion input terminals (−) of the comparators 221 of the digital pixels 200 in the second substrate 120 through the coupling capacitors C221.

<Reading Operation of Solid-State Imaging Device 10>

The above has described the characteristic configurations and functions of the parts of the solid-state imaging device 10. Next, a detailed description will be given of the reading operation of the pixel signal from the digital pixel 200 in the solid-state imaging device 10 relating to the first embodiment.

Figure 15:
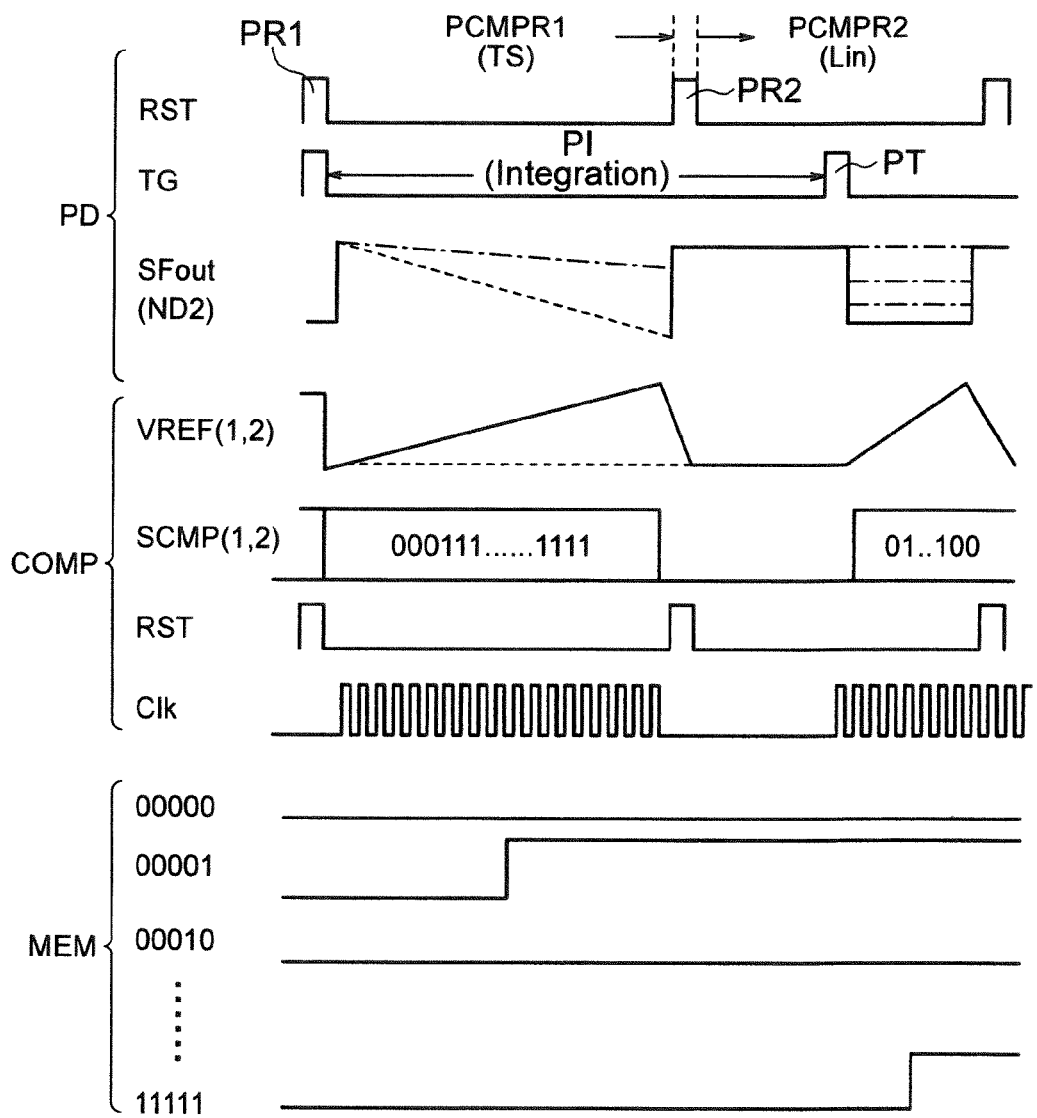
FIG. 15 is a timing chart to illustrate a reading operation performed in a predetermined shutter mode mainly by the pixel part of the solid-state imaging device relating to the first embodiment of the present invention.
Figure 16:
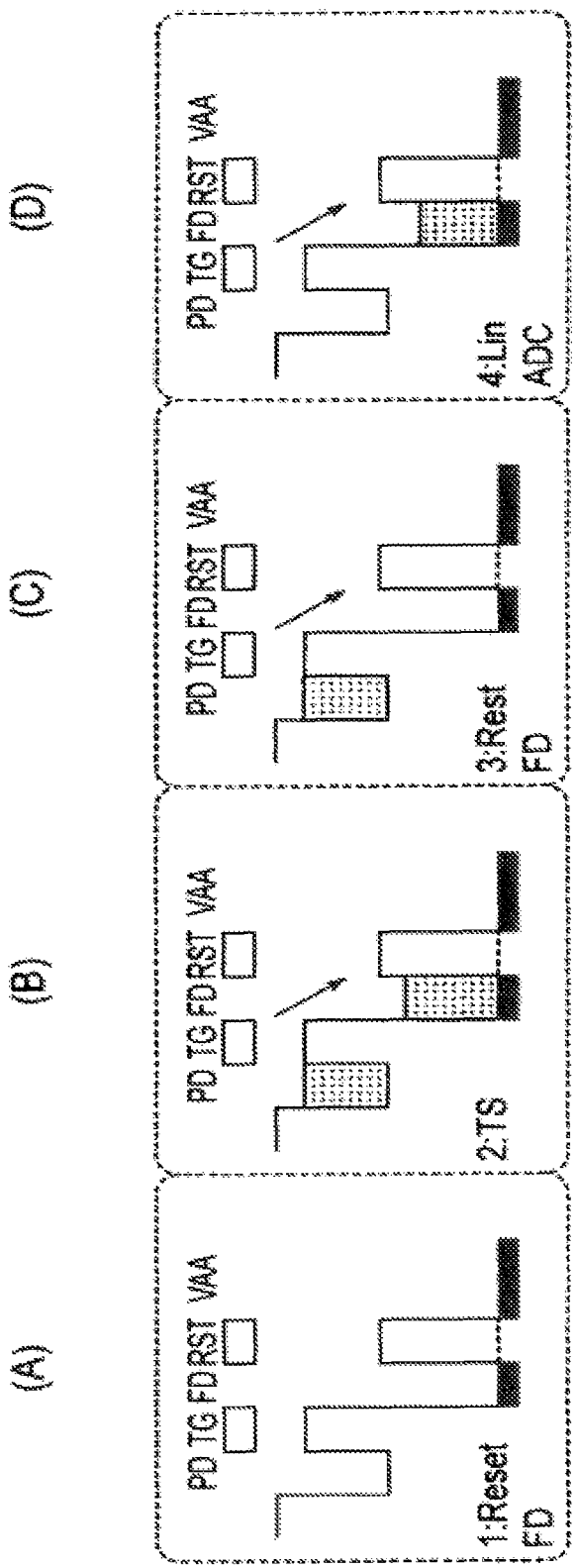
FIG. 16 includes parts (A) to (D) illustrating a sequence of operations and potential transition to explain a reading operation performed mainly by the pixel part of the solid-state imaging device relating to the first embodiment of the present invention in a predetermined shutter mode.

FIG. 15 is a timing chart to illustrate a reading operation performed in a predetermined shutter mode mainly by the pixel part of the solid-state imaging device relating to the first embodiment of the present invention. FIG. 16 includes parts (A) to (D) illustrating a sequence of operations and potential transition to explain a reading operation performed mainly by the pixel part of the solid-state imaging device relating to the first embodiment of the present invention in a predetermined shutter mode.

In order to start the reading operation, global resetting is performed to reset the photodiode PD1 and the floating diffusion FD1 in each digital pixel 200 as shown in FIG. 15 and the part (A) in FIG. 16. According to the global resetting, the reset transistor RST1-Tr and the transfer transistor TG1-Tr are brought into and remain in the conduction state for a predetermined period of time at the same time in all of the pixels, so that the photodiode PD1 and the floating diffusion FD1 are reset. Following this, the reset transistor RST1-Tr and the transfer transistor TG1-Tr are brought into the non-conduction state at the same time in all of the pixels, so that the exposure is started, in other words, the charges start to be stored in all of the pixels concurrently in parallel.

Then, as shown in FIG. 15 and the part (B) in FIG. 16, the time stamp (TS) ADC mode operation for the overflow charges starts. The overflow charges are stored in the floating diffusion FD1 in the storing period PI. The solid-state imaging device 10 operates in the time stamp ADC mode in a period within the storing period PI, more specifically, in a period within the storing period PI that lasts until the floating diffusion FD1 is reset.

In the time stamp (TS) ADC mode, the photoelectric conversion reading part 210 outputs, correspondingly to the first comparing operation period PCMP1 of the AD converting part 220, the voltage signal VSL1 corresponding to the overflow charges overflowing from the photodiode PD1 to the floating diffusion FD1 serving as an output node in the storing period PI. The comparator 221 of the AD converting part 220 performs the first comparing operation CMPR1. Under the control of the reading part 60, the comparator 221 outputs the digital first comparison result signal SCMP1 obtained by processing the voltage signal VSL 1 corresponding to the overflow charges overflowing from the photodiode PD1 to the floating diffusion FD1 serving as an output node within a certain period that is included in the storing period PI and lasts until the floating diffusion FD1 is reset, and digital data corresponding to the first comparison result signal SCMP1 is stored in the memory 231 of the memory part 230.

Next, as shown in FIG. 15 and the part (C) in FIG. 16, the time stamp (TS) ADC mode operation for the overflow charges ends, the linear ADC mode starts and the reset period PR2 for the floating diffusion FD1 starts. In the reset period PR2, the reset transistor RST1-Tr remains in the conduction state for a predetermined period of time, so that the floating diffusion FD1 is reset. The signal (VRST) in the floating diffusion FD1 at the time of resetting is read out, and the digital signal is stored in the memory 232 in the memory part 230. After this, the reset transistor RST1-Tr is brought into the non-conduction state. In this case, the storing period PI continues.

Following this, as shown in FIG. 15 and the part (D) in FIG. 16, the storing period PI ends and the transfer period PT starts. In the transfer period PT, the transfer transistor TG1-Tr remains in the conduction state for a predetermined period of time, so that the charges stored in the photodiode PD1 are transferred to the floating diffusion FD1.

In the linear (Lin) ADC mode, the photoelectric conversion reading part 210 outputs, correspondingly to the second comparing operation period PCMP2 of the AD converting part 220, the voltage signal VSL2 corresponding to the stored charges transferred from the photodiode PD1 to the floating diffusion FD1 serving as an output node, after the storing period PI ends. The comparator 221 of the AD converting part 220 performs the second comparing operation CMPR2. Under the control of the reading part 60, the comparator 221 outputs the digital second comparison result signal SCMP2 obtained by processing the voltage signal VSL2 corresponding to the stored charges transferred from the photodiode PD1 to the floating diffusion FD1 serving as an output node, after the storing period PI, and digital data corresponding to the second comparison result signal SCMP2 is stored in the memory 232 of the memory part 230.

The signal read out by the memory part 230 is sent outside the solid-state imaging device 10 (image sensor) via, for example, the IO buffer of the output circuit 40, which is driven by reading the digital signal data from the memory node and has such an MIPI data format. This operation is globally performed in all of the pixels in the pixel array.

As described above, in the solid-state imaging device 10 relating to the first embodiment, the pixel part 20 includes digital pixels, and each digital pixel includes the photoelectric conversion reading part 210, the AD converting part 220, and the memory part 230. The solid-state imaging device 10 is configured, for example, as a stacked CMOS image sensor capable of operating in a global shutter mode. In the solid-state imaging device 10 relating to the first embodiment, each digital pixel 200 has an AD converting function, and the AD converting part 220 includes the comparator 221 for performing a comparing operation of comparing the voltage signal read out from the photoelectric conversion reading part 210 against the referential voltage and outputting a digital comparison result signal.

The comparator 221 (700) relating to the first embodiment is constituted by the two stages of the preamplifiers 710 and 720 with a clamp diode and the two serial current-controlling inverters 730 and 740, and every branch is current-controlled. The two stages of the preamplifiers 710 and 720 and the following two consecutive inverters 730 and 740 are all current-controlled such that low power consumption and low peak current are realized. A trade-off can be made between the noise and the comparator speed by controlling the bandwidth of the comparator using the bias current. This is beneficial to more than one comparator operation mode. The last stage of the comparator 700 or second inverter 740 is controlled by the PMOS current source formed by the PMOS transistor PT742, and the NMOS transistor NT741 is completely turned on. This enables a low level (ground level) to be propagated more swiftly and strongly from the comparator to the word line (WL) of the SRAM bit cell, so that the access transistor connected to the word line can be blocked. In this way, what is saved in the SRAM bit cell is prevented from being overwritten through the bit line (BL), and the ADC code can be frozen.

The output from the first amplifier 710 is clamped by the diode-connected PMOS transistor PT751. When the ramp signal RAMP is initialized to the signal VINP, the output is clamped to the middle level (0.6 to 0.8 V) between the power supply (1.3 V) and the ground (0 V) irrespective of the input swing. This phenomenon defines the swing range to be from the clamp voltage to the threshold voltage of the preamplifier of the second stage. Accordingly, the transition voltage on the clamped node stays the same irrespective of the input swing. This results in no dependence on the input range and can accomplish high linearity. In other words, the diode-connected PMOS transistor PT751 provided for clamping limits the swing in the output signal vout1 that adjusts the transition voltage irrespective of the input swing.

The output signal vout1 constantly changes from the clamped voltage to the threshold voltage of the PMOS transistor PT721 of the second amplifier 720. This mechanism removes the dependence on the input and thus can achieve high linearity across the entire input range. The first noise bandwidth limiting capacitor C751 is connected at the first electrode thereof to the gate (input) of the PMOS transistor PT721 serving as a source grounded amplifier.

Accordingly, the first embodiment allows low power supply voltage to be used. Accordingly, the comparator can use the same voltage as the SRAM bit cell, which can reduce the use of metal resource. In addition, the operational current and peak current can be controlled, so that an array of pixels having a large format can be provided. A tradeoff can be made between the operational speed and the low-noise performance. Furthermore, the transition time of the output from the comparator is very short since the output is drawn only by the NMOS transistors. This reduces the manufacturing-induced variation in the output from the comparator.

In other words, in the first embodiment, the comparator constituting the ADC in each digital pixel is characterized by low power consumption and low peak current and capable of operating at low voltage and realizing high linearity across the entire input range.

Under the control of the reading part 60, the comparator 221 performs the first comparing operation CMPR1 and the second comparing operation CMPR2. The first comparing operation CMPR1 is designed to output a digital first comparison result signal SCMP1 obtained by processing the voltage signal corresponding to the overflow charges that overflow from the photodiode PD1 to the output node (floating diffusion) FD1 in the storing period. The second comparing operation CMPR2 is designed to output a digital second comparison result signal SCMP2 obtained by processing the voltage signal corresponding to the charges stored in the photodiode PD1 that are transferred to the floating node FD1 (output node) in a transfer period following the storing period.

In other words, the solid-state imaging device 10 relating to the first embodiment is capable of achieving a widened dynamic range and a raised frame rate since the charges overflowing from the photodiode in the storing period can be used real time. Additionally, the first embodiment is capable of substantially achieving a widened dynamic range and a raised frame rate, achieving reduced noise, and maximizing the effective pixel region and value per cost.

Additionally, the solid-state imaging device 10 relating to the first embodiment can prevent the increase in the configuration complexity and the reduction in area efficiency from the perspective of layout.

The solid-state imaging device 10 relating to the first embodiment has a stacked structure of the first substrate (an upper substrate) 110 and the second substrate (a lower substrate) 120. Accordingly, the first embodiment can maximize the value per cost since the first substrate 110 is basically formed only with NMOS elements and the pixel array can increase the effective pixel region to the maximum.

Second Embodiment

Figure 17:
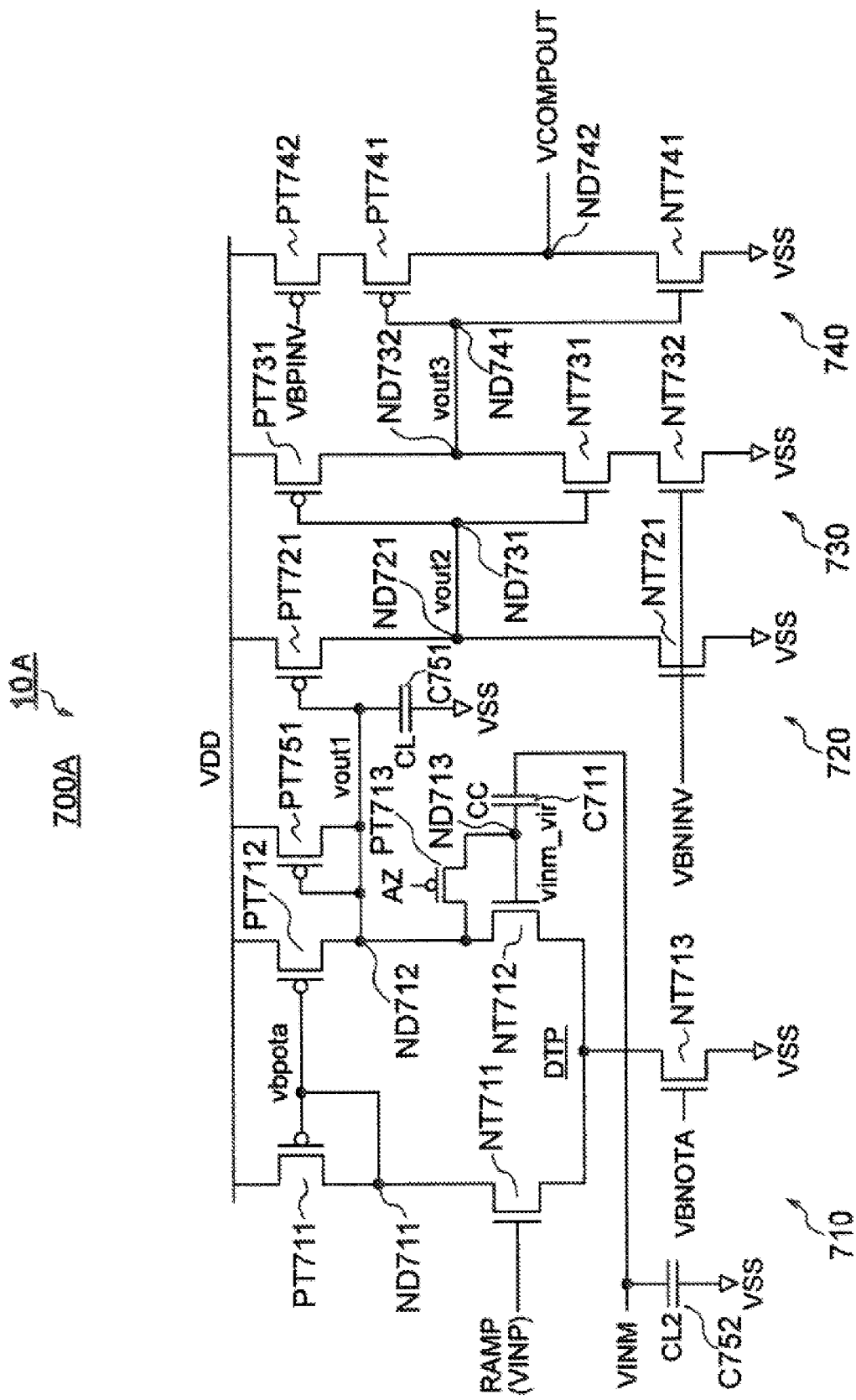
FIG. 17 is a circuit diagram showing an example configuration of a comparator relating to a second embodiment.

FIG. 17 is a circuit diagram showing an example configuration of a comparator relating to a second embodiment.

A solid-state imaging device 10A relating to the second embodiment differs from the solid-state imaging device 10 relating to the above-described first embodiment in the following points. In the solid-state imaging device 10A relating to the second embodiment, a second noise band limiting capacitor C752 is connected to the line to input the voltage signal VSL from the output buffer part 211 of the pixel into the autozero capacitor C711 of the first amplifier 710.

The source follower output in the pixel typically has a parasitic capacitance of 1 to 2 pF, which serves as a noise bandwidth limiting capacitor, but the source follower output in the DPS pixel does not have such a parasitic capacitance, unlike a typical rolling shutter CMOS image sensor. Accordingly, a noise spectrum with higher frequencies is transferred to the comparator, which eventually increases the comparator input conversion noise. To address this issue, in the second embodiment, in order to attenuate the noise, a second noise band limiting capacitor C752 is connected to the line to input the voltage signal VSL from the output buffer part 211 of the pixel 200 into the autozero capacitor C711 of the first amplifier 710. The pixel noise bandwidth limiting capacitor C752 (CL2) for the photodiode is added to the inverted input terminal (negative input terminal) of the low-noise comparator. The capacitor C752 effectively attenuates the high-frequency noise from the source follower output in the pixel.

Third Embodiment

Figure 18:
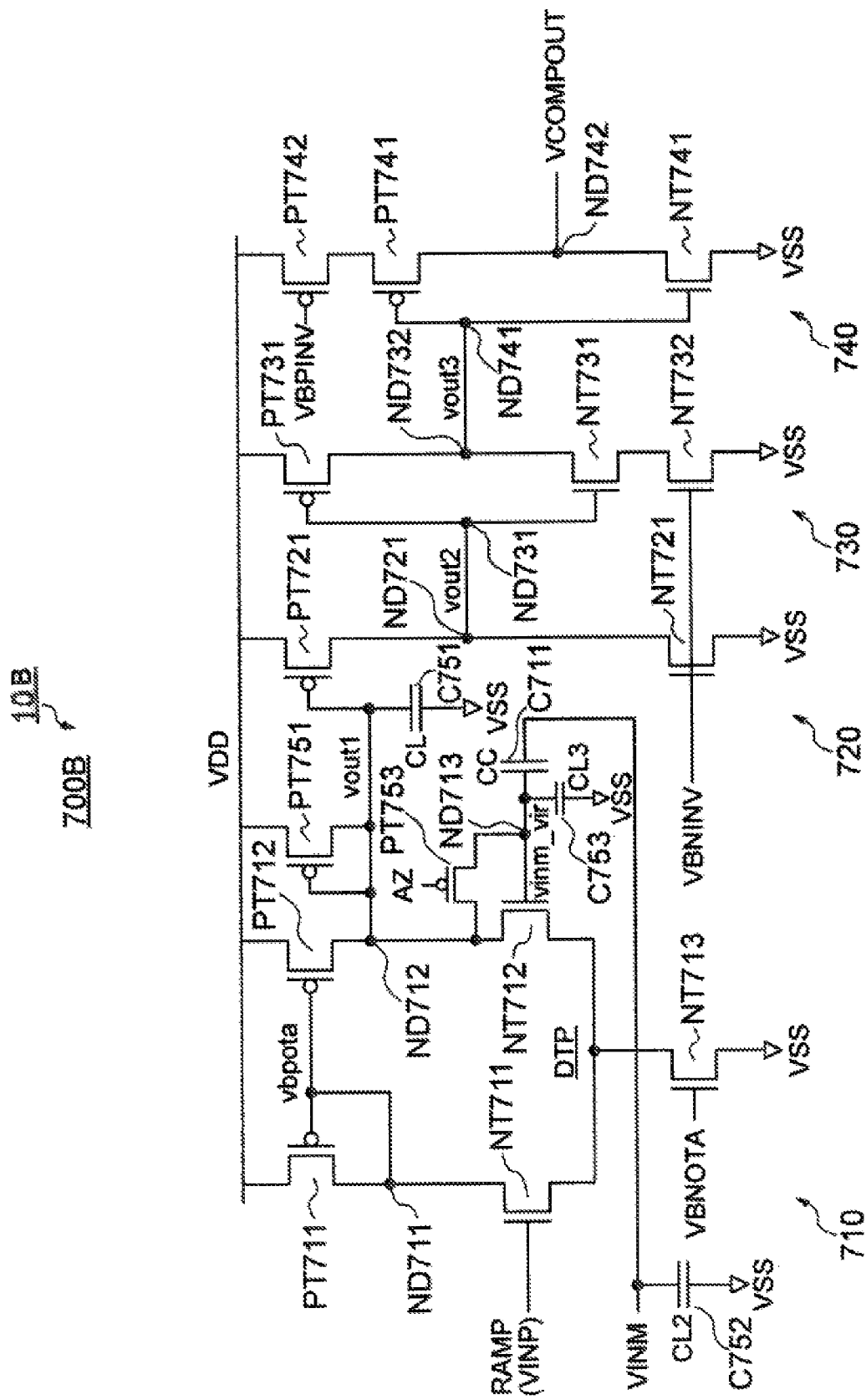
FIG. 18 is a circuit diagram showing an example configuration of a comparator relating to a third embodiment.

FIG. 18 is a circuit diagram showing an example configuration of a comparator relating to a third embodiment.

A solid-state imaging device 10B relating to the third embodiment differs from the solid-state imaging device 10A relating to the above-described second embodiment in the following points. In the solid-state imaging device 10B relating to the third embodiment, a third noise band limiting capacitor C753 is connected to the gate of the other NMOS transistor NT713 of the differential transistor pair DTP.

In a comparator 700B relating to the third embodiment, in order to reduce the AZ switch transistor noise during the AZ period, a third noise bandwidth limiting capacitor C753 is connected. If the parasitic capacitance connected to the node ND713 is small, high voltage noise appears. Accordingly, adding the third noise bandwidth limiting capacitor C753 (CL3) can effectively reduce the AZ noise.

Fourth Embodiment

Figure 19:
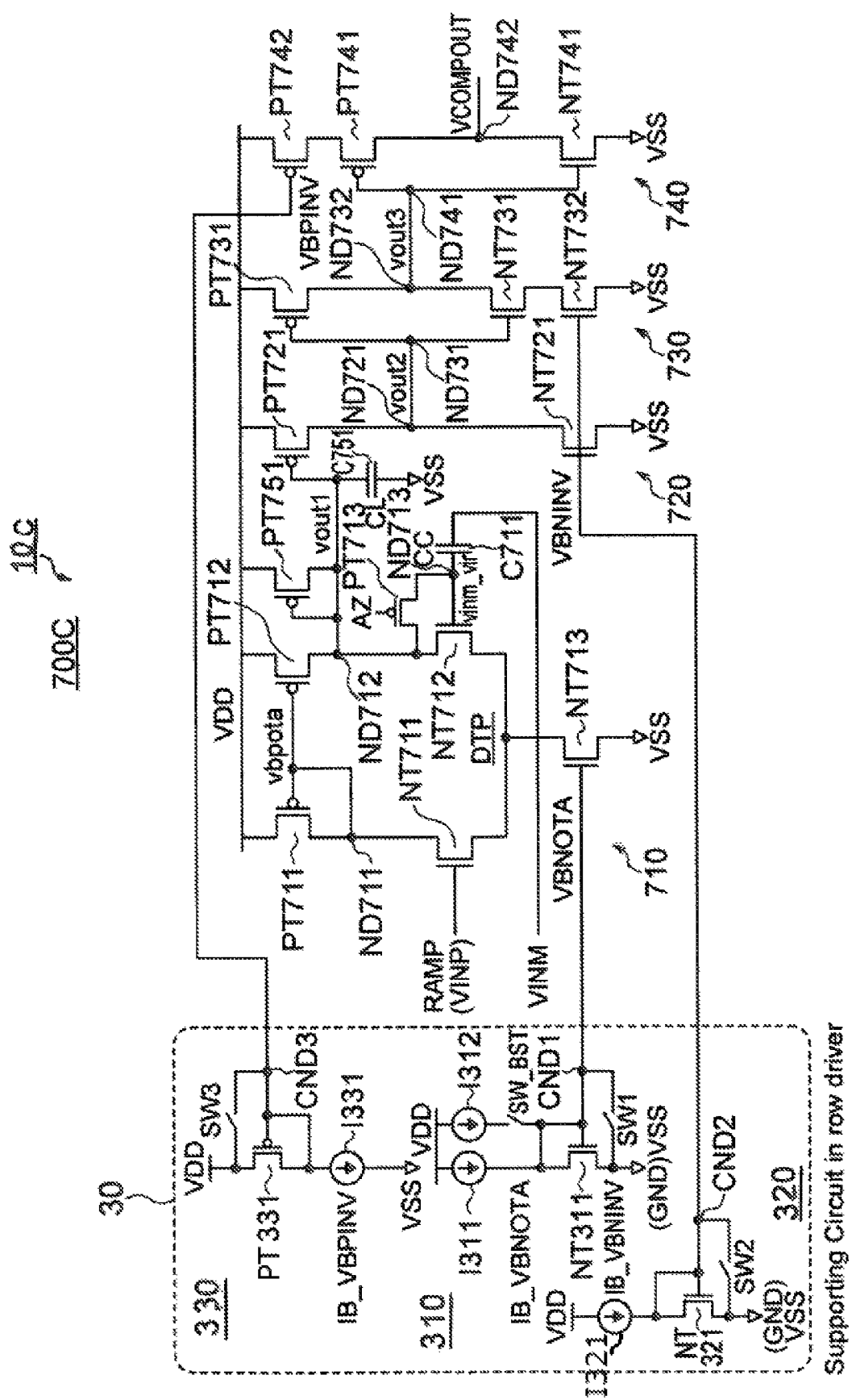
FIG. 19 is a circuit diagram showing an example configuration of a comparator relating to a fourth embodiment.

FIG. 19 is a circuit diagram showing an example configuration of a comparator relating to a fourth embodiment.

A solid-state imaging device 10C relating to the fourth embodiment differs from the solid-state imaging device 10 relating to the above-described first embodiment in the following points. In the solid-state imaging device 10C relating to the fourth embodiment, the vertical scanning circuit 30 serving as a row driver includes a supporting circuit for performing current control in the comparator 700C.

The vertical scanning circuit 30 constituting the reading part 60 includes a first supporting circuit 310 for controlling the gate voltage of the NMOS transistor NT713 forming the current source of the first amplifier 710, a second supporting circuit 320 for controlling the gate voltage of the current-controlling NMOS transistor NT721 of the second amplifier 720 and the gate voltage of the current controlling NMOS transistor NT732 of the first inverter 730 and a third supporting circuit 330 for controlling the gate voltage of the current-controlling PMOS transistor PT742 of the second inverter 740.

The first supporting circuit 310 includes a first control node CND1 connected to the gate of the NMOS transistor NT713 forming the current source of the first amplifier 710, a current mirror NMOS transistor NT311 connected at the source thereof to the reference potential VSS and at the gate and drain thereof to the first control node CND1, a first current source 1311 connected between the drain of the current mirror NMOS transistor NT311 and the power supply, and a first block switch SW1 connected between the first control node CND1 and the reference potential VSS for selectively blocking the current source 1311. The first supporting circuit 310 relating to the present embodiment includes a switch SW-BST and a current source 1312 connected between the first control node CND1 and the power supply potential VDD in order to selectively increase bias current.

The second supporting circuit 320 includes a second control node CND2 connected to the gate of the current-controlling NMOS transistor NT721 of the second amplifier 720 and the gate of the current-controlling NMOS transistor NT732 of the first inverter 730, a current mirror NMOS transistor NT321 connected at the source thereof to the reference potential VSS and at the gate and drain thereof to the second control node CND2, a second current source 1321 connected between the drain of the current mirror NMOS transistor NT321 and the power supply potential VDD, and a second block switch SW2 connected between the second control node CND2 and the reference potential VSS.

The third supporting circuit 330 includes a third control node CND3 connected to the gate of the current-controlling PMOS transistor PT742 of the second inverter 740, a current mirror PMOS transistor PT331 connected at the source thereof to the power supply potential VDD and at the gate and drain thereof to the third control node CND3, a third current source 1331 connected between the drain of the current mirror PMOS transistor PT731 and the reference potential VSS, and a third block switch SW3 connected between the third control node CND3 and the power supply potential VDD.

The first, second and third supporting circuits 310, 320 and 330 make it possible to independently control each branch current in the comparator 700 (221). The switches SW1, SW2 and SW3 are mounted to completely block the current source in the pixel considering the standby current consumption.

The switch SW-BST arranged in the first supporting circuit 310 increases the bias current for the first amplifier 710 of the first stage in order to achieve low noise performance for the input. As the transconductance increases in accordance with the increase in the current, the input conversion voltage noise spectrum decreases. This can be shown by the following expression.

$$\overline{V_{n,in}^2} = \frac{\overline{V_{n,out}^2}}{A_v^2} = 4kT\frac{\gamma}{g_m},$$

$V_{n,out}^2$: Output Conversion Noise
$A_v^2$: Voltage Gain, k: Boltzmann Constant,
T: Temperature, γ: Coefficient
$g_m$: Mutual Conductance In the fourth embodiment, the bias current for the comparator is generated within the row driver, and the block switches are added to reduce the standby current. Additionally, a current boost switch is added to the bias current generating part of the first amplifier 710 of the first stage in order to achieve low-noise performance. Since the current mirror ratio can be set high, the bias current for each branch can be accurately set. The running power can be reduced by reducing the standby current. Low noise performance can be achieved simply by boosting the current at the first stage.

Fifth Embodiment

Figure 20:
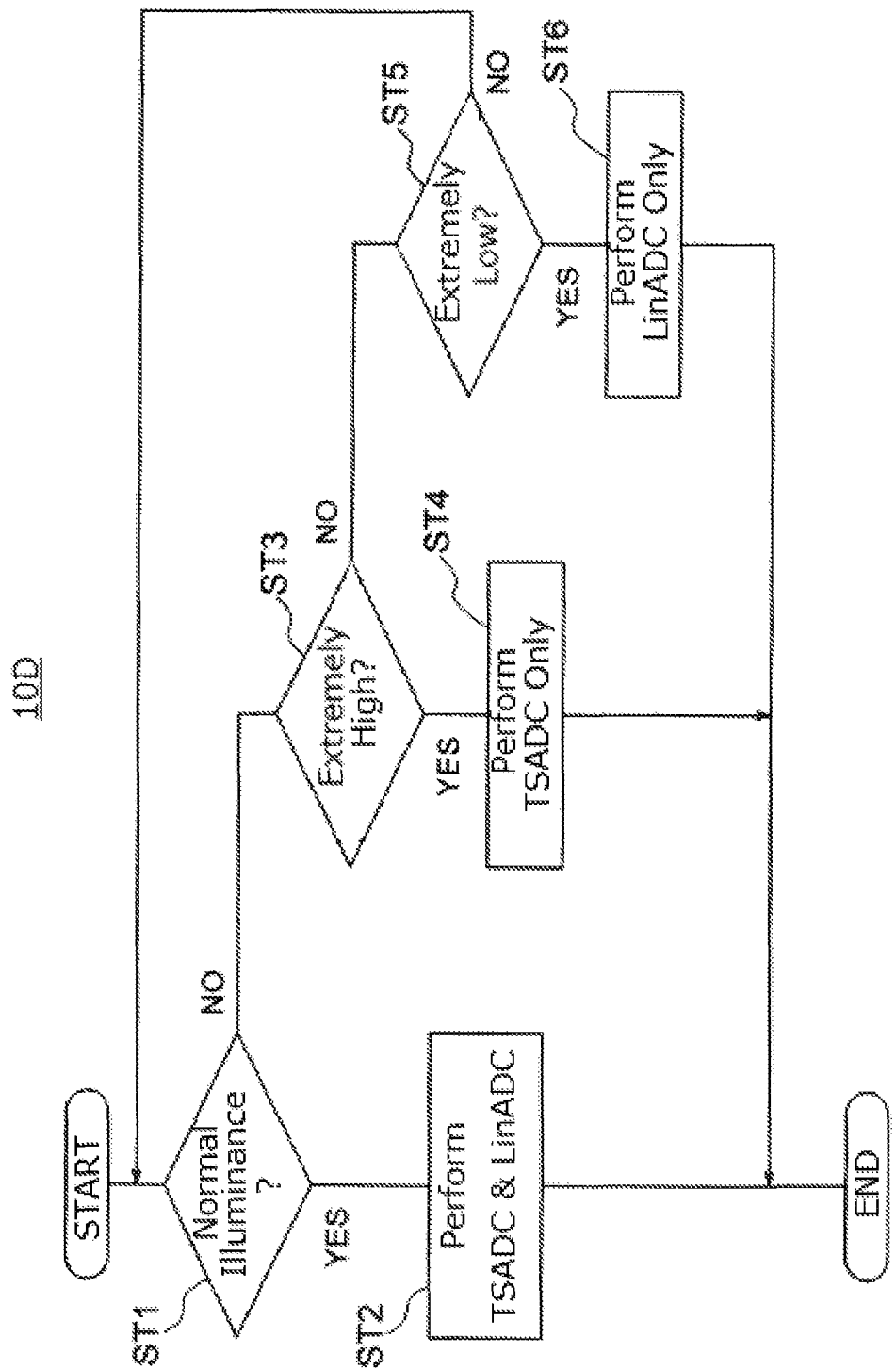
FIG. 20 is used to illustrate a solid-state imaging device relating to a fifth embodiment of the present invention and shows, as an example, how to make a selection between a time stamp ADC mode operation and a linear ADC mode operation.

FIG. 20 is used to illustrate a solid-state imaging device relating to a fifth embodiment of the present invention and shows, as an example, how to make a selection between a time stamp ADC mode operation and a linear ADC mode operation.

A solid-state imaging device 10D relating to the fifth embodiment differs from the solid-state imaging device 10 relating to the above-described first embodiment in the following points. The solid-state imaging device 10 relating to the first embodiment of the present invention operates in the time stamp (TS) ADC mode and the linear (Lin) ADC mode successively.

The solid-state imaging device 10D relating to the fifth embodiment of the present invention, on the other hand, can selectively operate in the time stamp (TS) ADC mode and the linear (Lin) ADC mode depending on the illuminance.

According to the example shown in FIG. 20, in the case of normal illuminance (ST1), the solid-state imaging device 10D successively operates in the time stamp ADC mode and the linear ADC mode (ST2). When the illuminance is not normal but extremely high (ST1, ST3), the solid-state imaging device 10D operates only in the time stamp ADC mode (ST4) since there is a high possibility that the charges may overflow from the photodiode PD1 to the floating diffusion FD1. When the illuminance is neither normal nor extremely high, but extremely low (ST1, ST3, ST5), the solid-state imaging device 10D operates only in the linear ADC mode (ST6) since there is an extremely low possibility that the charges may overflow from the photodiode PD1 to the floating diffusion FD1.

The fifth embodiment makes it possible not only to obtain the same effect as the first embodiment described above, but also to realize faster reading operation and achieve lower power consumption.

The solid-state imaging devices 10, 10A, 10B, 10C and 10D described above can be applied, as an imaging device, to electronic apparatuses such as digital cameras, video cameras, mobile terminals, surveillance cameras, and medical endoscope cameras.

Figure 21:
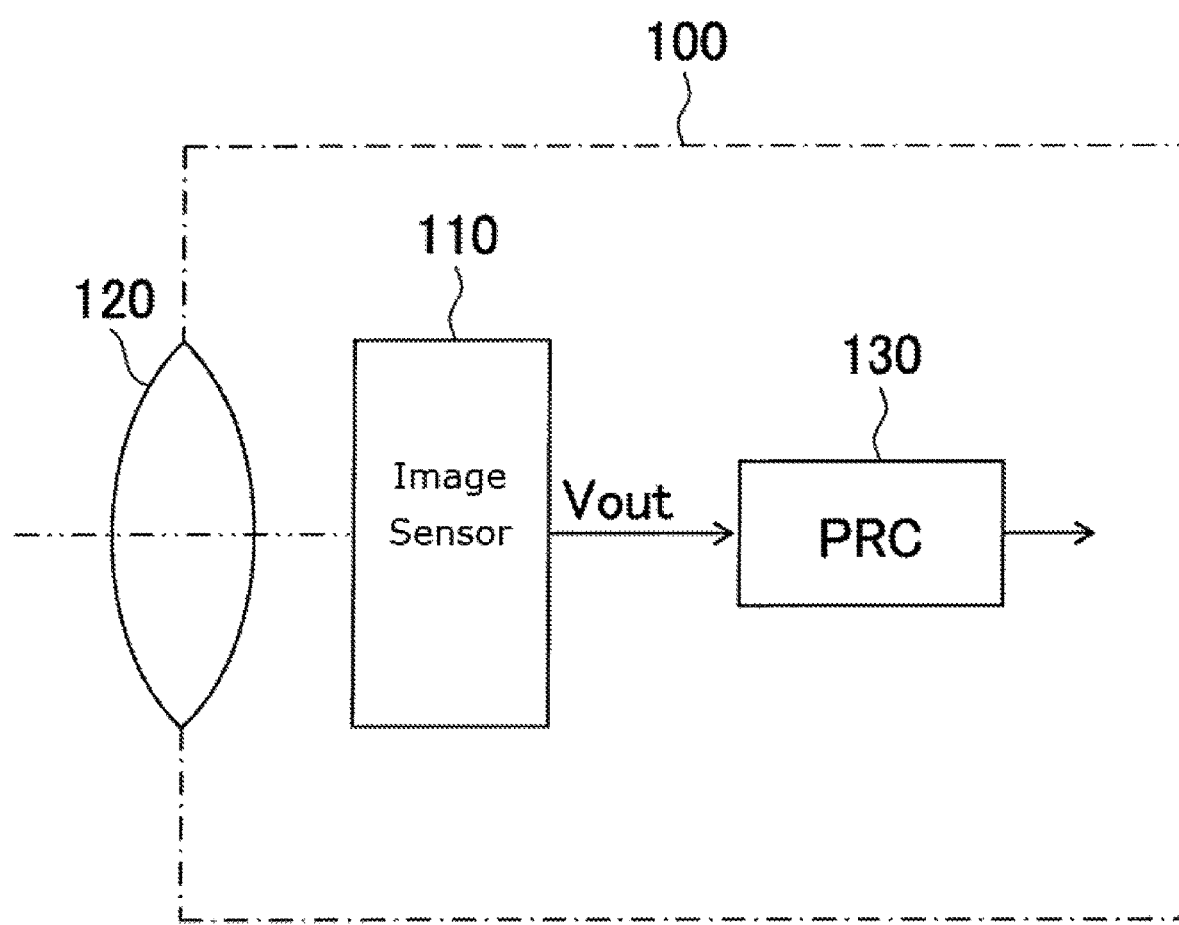
FIG. 21 shows an example configuration of an electronic apparatus to which the solid-state imaging devices relating to the embodiments of the present invention can be applied.

FIG. 21 shows an example of the configuration of an electronic apparatus including a camera system to which the solid-state imaging devices relating to the embodiments of the present invention are applied.

As shown in FIG. 21, the electronic apparatus 100 includes a CMOS image sensor 110 that can be constituted by the solid-state imaging device 10 relating to the embodiment of the present invention. Further, the electronic apparatus 100 includes an optical system (such as a lens) 120 for redirecting the incident light to pixel regions of the CMOS image sensor 110 (to form a subject image). The electronic apparatus 100 includes a signal processing circuit (PRC) 130 for processing output signals of the CMOS image sensor 310.

The signal processing circuit 130 performs predetermined signal processing on the output signals of the CMOS image sensor 110. The image signals processed in the signal processing circuit 130 can be handled in various manners. For example, the image signals can be displayed as a video image on a monitor having a liquid crystal display, or the image signals can be printed by a printer or recorded directly on a storage medium such as a memory card.

As described above, a high-performance, compact, and low-cost camera system can be provided that includes the above-described solid-state imaging device 10, 10A, 10B, 10C or 10D as the CMOS image sensor 110. Further, it is possible to produce electronic apparatuses such as surveillance cameras and medical endoscope cameras that are used for applications where cameras are required to be installed under restricted conditions such as the installation size, number of connectable cables, cable length, and installation height.

What is claimed is:

1. A solid-state imaging device comprising:
   a pixel part having a pixel arranged therein, the pixel performing photoelectric conversion; and
   a reading part for reading a pixel signal from the pixel in the pixel part,
   wherein the pixel has:
      a photoelectric conversion element for storing therein, in a storing period, charges generated by the photoelectric conversion;
      a transfer element for transferring, in a transfer period following the storing period, the charges stored in the photoelectric conversion element;
      an output node to which the charges stored in the photoelectric conversion element are transferred through the transfer element;
      an output buffer part for converting the charges in the output node into a voltage signal at a level determined by an amount of the charges and outputting the voltage signal; and
      a comparator for performing, for analog-to-digital (AD) conversion, a comparing operation of comparing the voltage signal output from the output buffer part against a referential voltage to output a digital comparison result signal, and
   wherein the comparator includes:
      a first amplifier including a differential amplifying part constituted by transistors a first one of which receives the referential voltage fed to a gate thereof and a second one of which receives the voltage signal from the output buffer part fed to a gate thereof, the differential amplifying part performing a comparing operation between the referential voltage and the voltage signal and inverting an output level when the referential voltage and the voltage signal become equal in level, the differential amplifying part being connected to a current-controllable current source;
      a second amplifier including an amplifying part for performing level inversion and gain-up on a first output signal from the first amplifier to generate a second output signal and outputting the second output signal, the second amplifier being current-controllable;
      a first inverter for inverting the second output signal from the second amplifier to generate a third output signal and outputting the third output signal, the first inverter being current-controllable; and
      a second inverter for inverting the third output signal from the first inverter to generate a fourth output signal and outputting the fourth output signal, the second inverter being current-controllable.

2. The solid-state imaging device according to claim 1, wherein the first amplifier includes:
   a differential transistor pair constituted by the transistors the first one of which receives the referential voltage fed to a gate thereof and the second one of which receives the voltage signal from the output buffer part fed to a gate thereof, the differential transistor pair performing a comparing operation between the referential voltage and the voltage signal;
   an autozero switch connected between a gate and a drain of the second one of the differential transistor pair; and
   an autozero capacitor connected to the gate of the second one of the differential transistor pair.

3. The solid-state imaging device according to claim 2, wherein the second amplifier includes:
   a first-conductivity-type field effect transistor connected at a gate thereof to an output node of the first amplifier and at a source thereof to a power supply potential, the gate serving as an input terminal; and
   a second-conductivity-type field effect transistor connected at a drain thereof to a drain of the first-conductivity-type field effect transistor and at a source thereof to a reference potential, a connecting node between the drain of the second-conductivity-type field effect transistor and the drain of the first-conductivity-type field effect transistor forming an output node of the second amplifier,
   wherein the differential transistor pair and the current-controllable current source of the first amplifier are formed using second-conductivity-type field effect transistors, and
   wherein the output node of the first amplifier is connected to a diode-connected clamp first-conductivity-type field effect transistor.

4. The solid-state imaging device according to claim 3, wherein a first noise band limiting capacitor is connected to the gate of the first-conductivity-type field effect transistor of the second amplifier.

5. The solid-state imaging device according to claim 4, wherein a second noise band limiting capacitor is connected to an input line to input the voltage signal into the autozero capacitor.

6. The solid-state imaging device according to claim 3, wherein a third noise band limiting capacitor is connected to the gate of the second one of the differential transistor pair.

7. The solid-state imaging device according to claim 3,
   wherein the first inverter includes:
      a first-inverter first-conductivity-type field effect transistor and a first-inverter second-conductivity-type field effect transistor gates of which are connected to form an input node and drains of which are connected to form an output node; and
      a current-controlling second-conductivity-type field effect transistor connected at a drain thereof to a source of the first-inverter second-conductivity-type field effect transistor gates and at a source thereof to the reference potential, a source of the first-inverter first-conductivity-type field effect transistor being connected to the power supply potential, and
   wherein the second inverter includes:
      a second-inverter first-conductivity-type field effect transistor and a second-inverter second-conductivity-type field effect transistor gates of which are connected to form an input node and drains of which are connected to form an output node; and
      a current-controlling first-conductivity-type field effect transistor connected at a drain thereof to a source of the second-inverter first-conductivity-type field effect transistor and at a source thereof to the power supply potential, a source of the second-inverter second-conductivity-type field effect transistor gates being connected to the reference potential.

8. The solid-state imaging device according to claim 7, wherein the reading part includes:
- a first supporting circuit for controlling a gate voltage of a second-conductivity-type field-effect transistor forming the current-controllable current source of the first amplifier;
- a second supporting circuit for controlling a gate voltage of the second-conductivity-type field-effect transistor of the second amplifier and a gate voltage of the current-controlling second-conductivity-type field effect transistor of the first inverter; and
- a third supporting circuit for controlling a gate voltage of the current-controlling first-conductivity-type field effect transistor of the second inverter.

9. The solid-state imaging device according to claim 8, wherein the first supporting circuit includes:
- a first control node connected to a gate of the second-conductivity-type field effect transistor forming the current-controllable current source of the first amplifier;
- a current mirror second-conductivity-type field effect transistor connected at a source thereof to the reference potential and at a gate and a drain thereof to the first control node;
- a first current source connected between the power supply potential and the drain of the current mirror second-conductivity-type field effect transistor; and
- a first block switch connected between the first control node and the reference potential, the first block switch selectively blocking the first current source, wherein the second supporting circuit includes:
- a second control node connected to a gate of the current-controlling second-conductivity-type field effect transistor of the second amplifier and a gate of the current-controlling second-conductivity-type field effect transistor of the first inverter;
- a current mirror second-conductivity-type field effect transistor connected at a source thereof to the reference potential and at a gate and a drain thereof to the second control node;
- a second current source connected between the power supply potential and the drain of the current mirror second-conductivity-type field effect transistor; and
- a second block switch connected between the second control node and the reference potential, and wherein the third supporting circuit includes:
- a third control node connected to a gate of the current-controlling first-conductivity-type field effect transistor of the second inverter;
- a current mirror first-conductivity-type field effect transistor connected at a source thereof to the power supply potential and at a gate and a drain thereof to the third control node;
- a third current source connected between the reference potential and the drain of the current mirror first-conductivity-type field effect transistor; and
- a third block switch connected between the third control node and the power supply potential.

10. The solid-state imaging device according to claim 9, wherein the first supporting circuit includes a switch and a current source connected between the first control node and the power supply potential in order to selectively increase bias current.

11. The solid-state imaging device according to claim 1, wherein the pixel has a memory part for saving analog-to-digital code (ADC) data corresponding to the digital comparison result signal from the comparator, and wherein the memory part is formed using static random access memory (SRAM), and an ADC code is written into and read from the memory part under control of the reading part.

12. The solid-state imaging device according to claim 1, wherein the comparator is configured to perform, under control of the reading part:
- a first comparing operation of outputting a digital first comparison result signal obtained by processing the voltage signal corresponding to overflow charges overflowing from the photoelectric conversion element to the output node in the storing period; and
- a second comparing operation of outputting a digital second comparison result signal obtained by processing the voltage signal corresponding to charges stored in the photoelectric conversion element that are transferred to the output node in the transfer period following the storing period.

13. The solid-state imaging device according to claim 12, wherein, as a result of the first comparing operation, the comparator outputs the digital first comparison result signal corresponding to a time determined by an amount of the overflow charges.

14. The solid-state imaging device according to claim 13, wherein, in the first comparing operation, the comparator is configured to handle a light level as long as the light level produces a signal level ranging from (i) a signal level of the photoelectric conversion element obtained with a maximum value of a sampling time that is required to cause the overflow charges to start overflowing from the photoelectric conversion element to the output node to (ii) a signal level obtained with a minimum value of the sampling time.

15. The solid-state imaging device according to claim 12,
- wherein the storing period is a period from when the photoelectric conversion element and the output node are reset to a reset level to when the transfer period starts as the transfer element is brought into a conduction state,
- wherein a period of the first comparing operation is a period from when the photoelectric conversion element and the output node are reset to a reset level and to when the output node is reset to a reset level before the transfer period starts, and
- wherein a period of the second comparing operation is a period that starts after the output node is reset to a reset level and that includes a period after the transfer period.

16. The solid-state imaging device according to claim 12, wherein the reading part controls the first comparing operation and the second comparing operation such that the first and second comparing operations are selectively performed depending on illuminance.

17. The solid-state imaging device according to claim 1, wherein the pixel has:
- a floating diffusion serving as the output node; and
- a reset element for resetting, in a reset period, the floating diffusion to a predetermined potential, and wherein the output buffer part includes:
- a source follower element for converting charges in the floating diffusion into a voltage signal at a level determined by the amount of the charges and outputting the voltage signal; and
- a current source connected to a source of the source follower element.

18. The solid-state imaging device according to claim 1, comprising:
a first substrate; and
a second substrate,
wherein the first substrate and the second substrate have a stacked structure in which the first substrate and the second substrate are connected through a connection part,
wherein the pixel has a memory part for saving analog-to-digital code (ADC) data corresponding to the digital comparison result signal from the comparator,
wherein the first substrate at least has the photoelectric conversion element, the transfer element, the output node and the output buffer part of the pixel formed therein, and
wherein the second substrate at least has at least a portion of the reading part, the memory part, and the comparator formed therein.

19. The solid-state imaging device of claim 1, wherein bias current is used to control a bandwidth of the comparator.

20. An electronic apparatus comprising:
a solid-state imaging device; and
an optical system for forming a subject image on the solid-state imaging device,
wherein the solid-state imaging device includes:
 a pixel part having a pixel arranged therein, the pixel performing photoelectric conversion; and
 a reading part for reading a pixel signal from the pixel in the pixel part,
 wherein the pixel has:
  a photoelectric conversion element for storing therein, in a storing period, charges generated by the photoelectric conversion;
  a transfer element for transferring, in a transfer period following the storing period, the charges stored in the photoelectric conversion element;
  an output node to which the charges stored in the photoelectric conversion element are transferred through the transfer element;
  an output buffer part for converting the charges in the output node into a voltage signal at a level determined by an amount of the charges and outputting the voltage signal; and
  a comparator for performing, for analog-to-digital (AD) conversion, a comparing operation of comparing the voltage signal output from the output buffer part against a referential voltage to output a digital comparison result signal, and
wherein the comparator includes:
 a first amplifier including a differential amplifying part constituted by transistors a first one of which receives the referential voltage fed to a gate thereof and a second one of which receives the voltage signal from the output buffer part fed to a gate thereof, the differential amplifying part performing a comparing operation between the referential voltage and the voltage signal and inverting an output level when the referential voltage and the voltage signal become equal in level, the differential amplifying part being connected to a current-controllable current source;
 a second amplifier including an amplifying part for performing level inversion and gain-up on a first inverted output from the first amplifier to generate a second output signal and outputting the second output signal, the second amplifier being current-controllable;
 a first inverter for inverting the second output signal from the second amplifier to generate a third output signal and outputting the third output signal, the first inverter being current-controllable; and
 a second inverter for inverting the third output signal from the first inverter to generate a fourth output signal and outputting the fourth output signal, the second inverter being current-controllable.

* * * * *